(12) United States Patent
Itou et al.

(10) Patent No.: US 8,462,962 B2
(45) Date of Patent: Jun. 11, 2013

(54) SOUND PROCESSOR, SOUND PROCESSING METHOD AND RECORDING MEDIUM STORING SOUND PROCESSING PROGRAM

(75) Inventors: Taisuke Itou, Osaka (JP); Naoshi Matsuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 259 days.

(21) Appl. No.: 12/860,322

(22) Filed: Aug. 20, 2010

(65) Prior Publication Data

US 2011/0019832 A1     Jan. 27, 2011

Related U.S. Application Data

(63) Continuation of application No. PCT/JP2008/052843, filed on Feb. 20, 2008.

(51) Int. Cl.
*H04B 3/20* (2006.01)

(52) U.S. Cl.
USPC ............. 381/94.3; 381/66; 381/61; 381/94.1; 381/104; 381/71.1; 381/107; 704/233; 704/214; 379/390.03; 379/392.01; 379/406.05; 379/406.01

(58) Field of Classification Search
USPC .................. 381/66, 61, 94.1, 93.3, 71.1, 104, 381/107; 379/390.03, 392.01, 406.05–406.06, 379/406.01; 704/233, 214
See application file for complete search history.

(56) References Cited

U.S. PATENT DOCUMENTS

| | | | |
|---|---|---|---|
| 6,339,758 B1 * | 1/2002 | Kanazawa et al. ............. 704/226 |
| 6,563,925 B1 * | 5/2003 | Krasny ..................... 379/406.05 |
| 7,003,099 B1 * | 2/2006 | Zhang et al. ............. 379/406.03 |
| 7,747,001 B2 * | 6/2010 | Kellermann et al. ..... 379/406.01 |
| 8,160,262 B2 * | 4/2012 | Buck et al. ...................... 381/66 |
| 2003/0039353 A1 * | 2/2003 | Matsuo .................... 379/406.01 |
| 2006/0034476 A1 * | 2/2006 | Glezerman ................... 381/375 |
| 2006/0251261 A1 * | 11/2006 | Christoph ......................... 381/1 |
| 2007/0047743 A1 * | 3/2007 | Taenzer et al. .................. 381/92 |

(Continued)

FOREIGN PATENT DOCUMENTS

| EP | 1 065 909 A2 | 1/2001 |
|---|---|---|
| JP | 2001-45592 | 2/2001 |
| JP | 2005-136701 | 5/2005 |
| JP | 2007-183306 | 7/2007 |

OTHER PUBLICATIONS

Nedelko et al, Acoustic Echo Cancelling and Noise Suppression with Microphone Arrays, Apr. 19999.*

(Continued)

*Primary Examiner* — Davetta W. Goins
*Assistant Examiner* — Kuassi Ganmavo
(74) *Attorney, Agent, or Firm* — Staas & Halsey LLP

(57) ABSTRACT

A sound processor includes a conversion unit converts a reference sound signal corresponding to a base of sound to be output and an observation sound signal based on each of sound signals output by a plurality of sound receiving units into frequency components, an echo suppression unit estimates echo derived from sound based on a converted reference sound signal and suppressing the estimated echo in a converted observation sound signal, a noise suppression unit estimates noise based on an arrival direction of sound and suppressing the estimated noise in the converted observation sound signal and an integrating process unit suppresses, with respect to each frequency component, echo and noise in the converted sound signal based on a observation sound signal obtained after echo suppression and a observation sound signal obtained after noise suppression.

10 Claims, 26 Drawing Sheets

U.S. PATENT DOCUMENTS

| | | | |
|---|---|---|---|
| 2007/0156399 A1 | 7/2007 | Matsuo | |
| 2008/0101622 A1* | 5/2008 | Sugiyama | 381/66 |
| 2008/0192946 A1* | 8/2008 | Faller | 381/66 |
| 2010/0150365 A1* | 6/2010 | Fujimaki | 381/71.1 |
| 2011/0033059 A1* | 2/2011 | Bhaskar et al. | 381/71.4 |

OTHER PUBLICATIONS

Reuven et al, Joint Noise Reduction and Acoustic Echo Cancellation using the Transfer-Function Generalized Sidelobe Canceller.*

Sadaoki Furui, "Sound and Acoustic Technology," First Edition, Kindai Kagakusha Co., Ltd., Sep. 1992, pp. 84-85.

Kazunori Kobayashi et al., "A Microphone Array System with Echo Canceller," The Transactions of the Institute of Electronics, Information and Communication Engineers, vol. J87-A, No. 2, The Institute of Electronics, Information, and Communication Engineers, Feb. 2001, pp. 143-152.

Sumitaka Sakauchi et al., "An Acoustic Echo Canceller with Noise and Echo Reduction," The Transactions of the Institute of Electronics, Information and Communication Engineers, vol. J87-A, No. 4, Apr. 2004, pp. 448-457.

International Search Report for PCT/JP2008/052843, mailed Jun. 3, 2008.

* cited by examiner

SOUND PROCESSOR, SOUND PROCESSING METHOD AND RECORDING MEDIUM STORING SOUND PROCESSING PROGRAM

CROSS-REFERENCE TO RELATED APPLICATIONS

This application is the continuation, filed under 35 U.S.C. §111(a), of PCT International Application No. PCT/JP2008/052843 which has an International filing date of Feb. 20, 2008 and designated the United States of America.

FIELD

The present application relates to a sound processor, operated in cooperation with a sound outputting unit for outputting sound on the basis of a sound signal and a plurality of sound receiving units for outputting a sound signal on the basis of input sound, for processing the sound signal based on the sound output by the sound receiving units, a sound processing method to be executed by the sound processor, and a recording medium.

BACKGROUND

In an apparatus equipped with a speaker and a microphone, such as a videoconference system, a cellular phone, or a car navigation system having a voice output/recognition function, an echo suppressing process for removing echo derived from sound output from the speaker from sound received by the microphone has been realized.

FIG. 1 is a block diagram illustrating the structure of a conventional echo suppression device. In FIG. 1, a reference numeral 10000 denotes an echo suppression device for executing the echo suppressing process. The echo suppression device 10000 includes a speaker 10001 for outputting sound on the basis of a reference sound signal y(t) and a microphone 10002 for converting input sound into an observation sound signal x(t). The echo suppression device 10000 also includes an adaptive filter 10003 used for removing echo from the observation sound signal x(t).

The microphone 10002 receives not only voice of a speaking person but also various sounds including sound output from the speaker 10001 and other noises. In other words, sound output from the speaker 10001 on the basis of the reference sound signal y(t) is input to the microphone 10002 through a sound field of the external environment. When impulse response between the speaker 10001 and the microphone 10002 is expressed as h(t), the echo suppression device 10000 obtains an estimated value a(t) of the impulse response h(t) by using the adaptive filter 10003, so as to derive a signal y'(t) obtained by allowing the reference sound signal y(t) to pass through the adaptive filter 10003. As a method for estimating the estimated value a(t), the method of steepest descent, the LMS (Least Mean Square) method, the learning identification method or the like is employed. Then, the thus obtained signal y'(t) is subtracted from the observation sound signal x(t), so as to remove echo derived from the output of the speaker 10001, resulting in deriving a differential signal e(t). Incidentally, when a signal included in the observation sound signal x(t) is merely residual echo derived from the output of the speaker 10001, the estimation is performed by operating the adaptive filter 10003 so as to minimize the power of the differential signal e(t) (see, for example, "Sound and Acoustic Technology", first edition, by Sadaoki Furui, published by Kindai Kagaku sha Co., Ltd., September 1992, pp. 84-85).

Thereafter, various processing such as voice recognition is executed on the basis of the differential signal e(t).

Furthermore, a noise suppressing process for estimating an arrival direction of sound by utilizing a plurality of microphones and suppressing, as ambient noise, sound arriving from directions other than a target direction such as a direction of a speaking person has been realized.

FIG. 2 is a block diagram illustrating the structure of a conventional noise suppression device. In FIG. 2, a reference numeral 20000 denotes a noise suppression device for suppressing ambient noise on the basis of arrival directions. The noise suppression device 20000 includes a first microphone 20001 and a second microphone 20002 disposed at an appropriate distance d, and the first microphone 20001 and the second microphone 20002 respectively output a first sound signal x1(t) and a second sound signal x2(t) on the basis of sound input thereto. The noise suppression device 20000 further includes a first FIR (Finite Impulse Response) filter 20003 for filtering the first sound signal x1(t) on the basis of a first filter factor $H1(\omega)$ set therein and a second FIR filter 20004 for filtering the second sound signal x2(t) on the basis of a second filter factor $H2(\omega)$ set therein. The noise suppression device 20000 further includes a filter factor derivation unit 20005 for respectively deriving the first filter factor $H1(\omega)$ of the first FIR filter 20003 and the second filter factor $H2(\omega)$ of the second FIR filter 20004 on the basis of the first sound signal x1(t) and the second sound signal x2(t) and for outputting the derived first filter factor $H1(\omega)$ and second filter factor $H2(\omega)$ respectively to the first FIR filter 20003 and the second FIR filter 20004. Moreover, the noise suppression device 20000 includes an adder 20006 for outputting a sound signal r(t) obtained by summing up a first sound signal x1'(t) and a second sound signal x2'(t) resulting from the filtering respectively by the first FIR filter 20003 and the second FIR filter 20004.

In FIG. 2, assuming that an ambient noise source is sufficiently away from the first microphone 20001 and the second microphone 20002 and that ambient noise to be suppressed arrives from a direction θ as plane waves, the noise is first received by the first microphone 20001 and then received by the second microphone 20002 late by delay time τ(=d sin θ/c, c: acoustic velocity). Accordingly, when the first filter factor $H1(\omega)$ having a transfer factor with the delay time τ and in an opposite phase is set in the first FIR filter 20003 and the second filter factor $H2(\omega)$ having a transfer factor of 1 is set in the second FIR filter 20004, the sound signal r(t) becomes a signal in which the ambient noise arriving from the direction θ is suppressed. Through application of this technique, an arrival direction of sound of each frequency may be estimated so as to suppress, as ambient noise, sound arriving from directions other than a target direction such as a direction of a speaking person (see, for example, "Sound and Acoustic Technology", first edition, by Sadaoki Furui, published by Kindai Kagaku sha Co., Ltd., September 1992, pp. 85-86). Thereafter, various processing such as voice recognition is executed on the basis of the sound signal r(t).

Although the echo suppression device of FIG. 1 may suppress echo on the basis of a reference sound signal, it has a problem that ambient noise other than the echo may not be suppressed. Although the noise suppression device of FIG. 2 may suppress ambient noise other than sound arriving from a specific target direction such as a direction of a speaking person, if the speaker is disposed in the vicinity of the speaking person, sound output from the speaker may not be sufficiently suppressed. Accordingly, a sound processor capable of complementing the problems of the echo suppression device for suppressing echo and the noise suppression device for suppressing ambient noise in accordance with an arrival direction by combining these techniques has begun to be examined.

FIG. 3 is a block diagram illustrating the structure of a conventional sound processor. In FIG. 3, a reference numeral 30000 denotes a sound processor obtained by combining an echo suppression device for suppressing echo and a noise suppression device for suppressing ambient noise in accordance with an arrival direction. The sound processor 30000 includes a speaker 30001 for outputting sound on the basis of a reference sound signal y(t), and a first microphone 30002 and a second microphone 30003 for converting input sound respectively into a first observation sound signal x1(t) and a second observation sound signal x2(t).

The sound processor 30000 includes a noise suppression unit 30004 for suppressing noise in the first observation sound signal x1(t) and the second observation sound signal x2(t) on the basis of an arrival direction, and the noise suppression unit 30004 outputs an observation sound signal x_r(t) with ambient noise suppressed. Furthermore, the sound processor 30000 includes an echo suppression unit 30005 for suppressing echo based on the reference sound signal y(t) in the observation sound signal x_r(t) with ambient noise suppressed, and the echo suppression unit 30005 outputs a signal e_r(t) with ambient noise and echo suppressed. Thereafter, various processing such as voice recognition is executed on the basis of the signal e_r(t).

The sound processor of FIG. 3 employs the structure in which echo is suppressed after suppressing ambient noise in accordance with an arrival direction.

FIG. 4 is a block diagram illustrating the structure of another conventional sound processor. In FIG. 4, a reference numeral 40000 denotes a sound processor obtained by combining an echo suppression device for suppressing echo and a noise suppression device for suppressing ambient noise in accordance with an arrival direction. The sound processor 40000 includes a speaker 40001 for outputting sound on the basis of a reference sound signal y(t), and a first microphone 40002 and a second microphone 40003 for converting input sound respectively into observation sound signals x1(t) and x2(t).

The sound processor 40000 includes a first echo suppression unit 40004 for suppressing echo based on the reference sound signal y(t) in the first observation sound signal x1(t), and the first echo suppression unit 40004 outputs a first observation sound signal e1(t) with echo suppressed. Also, the sound processor 40000 includes a second echo suppression unit 40005 for suppressing echo based on the reference sound signal y(t) in the second observation sound signal x2(t), and the second echo suppression unit 40005 outputs a second observation sound signal e2(t) with echo suppressed. Furthermore, the sound processor 40000 includes a noise suppression unit 40006 for suppressing ambient noise on the basis of an arrival direction in the first observation sound signal e1(t) and the second observation sound signal e2(t) in which the echo has been suppressed, and the noise suppression unit 40006 outputs a signal e_r(t) with ambient noise and echo suppressed. Thereafter, various processing such as voice recognition is executed on the basis of the signal e_r(t).

The sound processor of FIG. 4 employs the structure in which ambient noise is suppressed on the basis of an arrival direction after suppressing echo.

SUMMARY

According to an aspect of the invention, a sound processor includes a conversion unit converts a reference sound signal corresponding to a base of sound to be output by a sound outputting unit and an observation sound signal based on each of sound signals output by a plurality of sound receiving units into components on a frequency axis, an echo suppression unit estimates echo derived from sound based on a converted reference sound signal and suppresses a estimated echo in a converted observation sound signal with respect to each frequency component, a noise suppression unit estimates noise based on an arrival direction of sound that is obtained from a time difference between input sounds into the plurality of sound receiving units and suppresses the estimated noise in the converted observation sound signal with respect to each frequency component and an integrating unit suppresses, with respect to each frequency component, echo and noise in the converted sound signal based on a observation sound signal obtained after echo suppression and a observation sound signal obtained after noise suppression.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
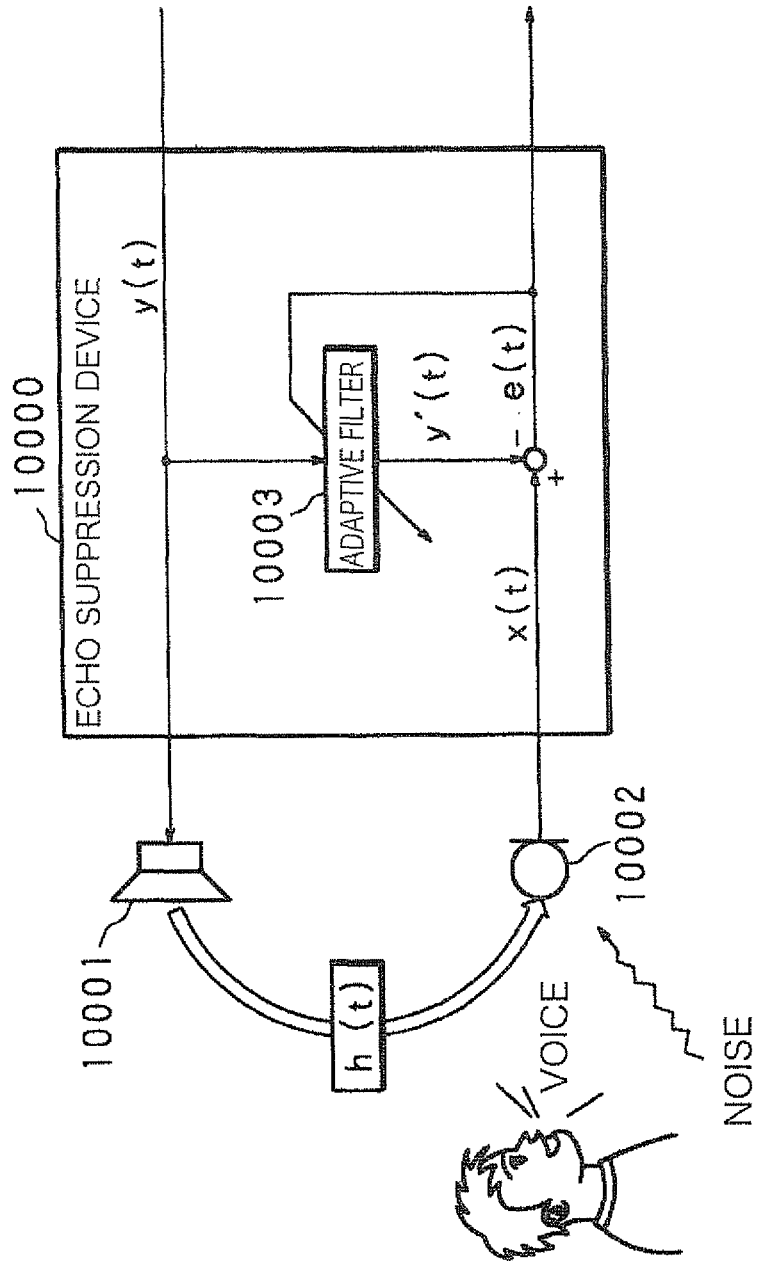
FIG. 1 is a block diagram illustrating the structure of a conventional echo suppression device.
Figure 2:
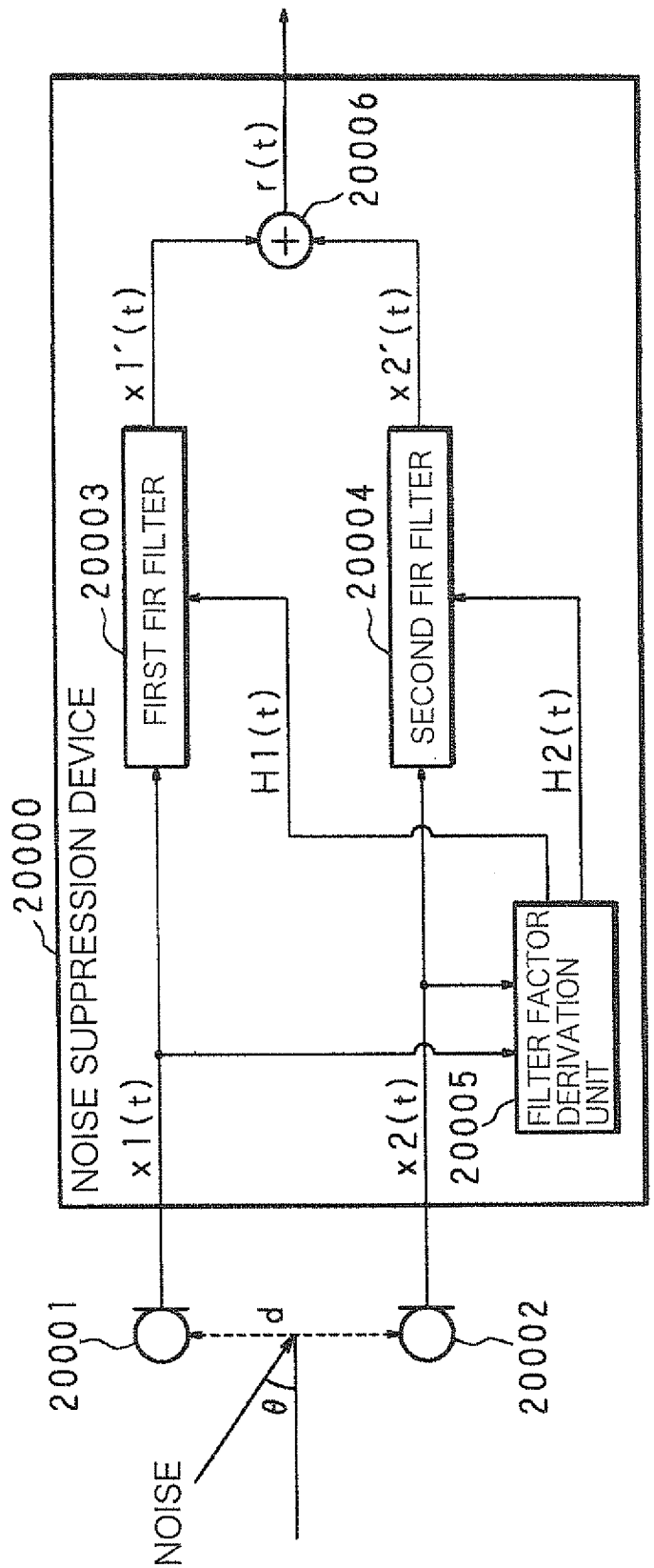
FIG. 2 is a block diagram illustrating the structure of a conventional noise suppression device.
Figure 3:
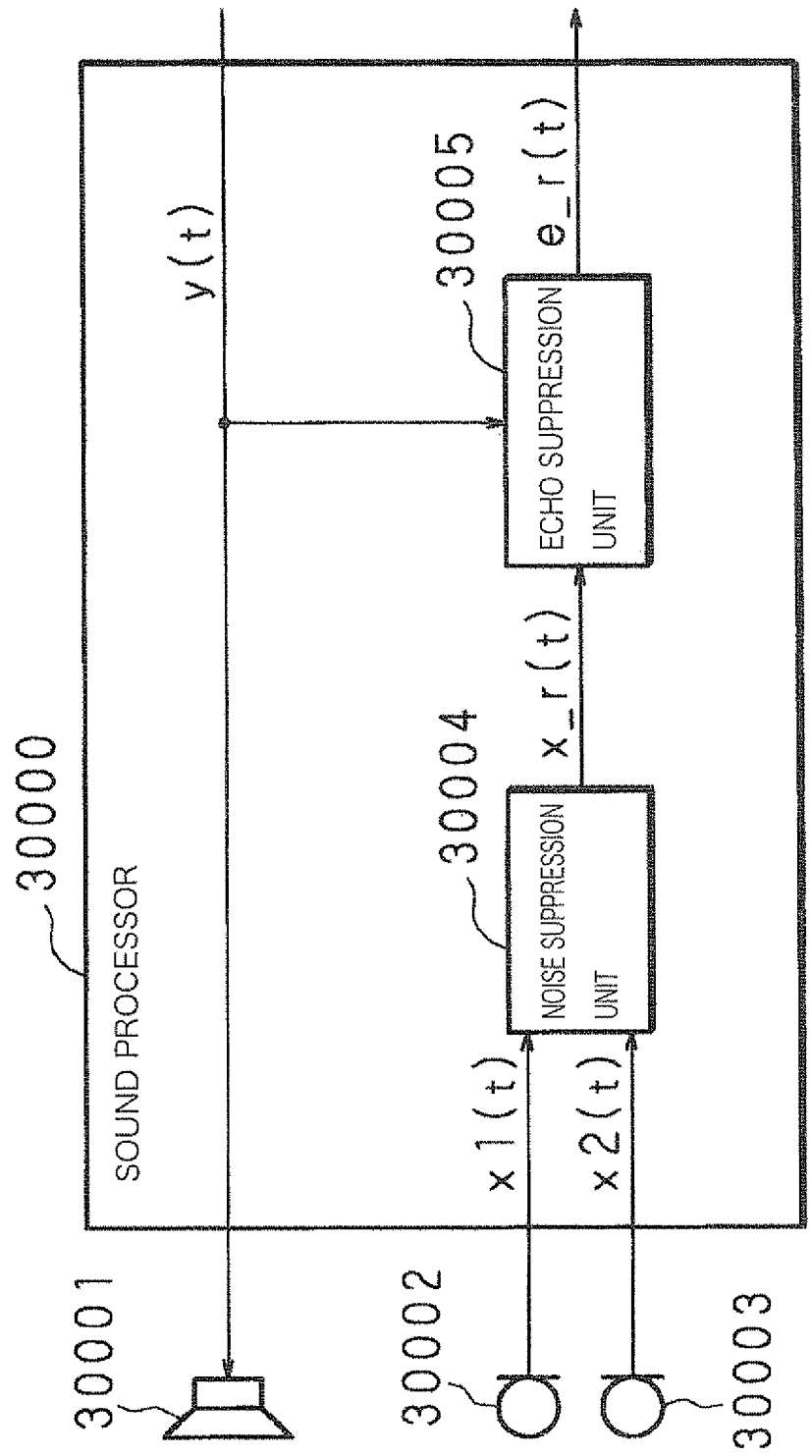
FIG. 3 is a block diagram illustrating the structure of a conventional sound processor.

In the apparatus in which echo is suppressed after suppressing ambient noise on the basis of an arrival direction as illustrated in FIG. 3, however, distortion is caused in a signal obtained after suppressing the noise on the basis of an arrival direction. Accordingly, since an acoustic distance between an observation sound signal with ambient noise suppressed and a reference sound signal is large in the echo suppressing process, there arises a problem that the accuracy in suppressing echo in the echo suppressing process is degraded. Also, since the echo suppressing process is performed on the basis of the distorted signal obtained after the noise suppression, there arises a problem that the tone quality is degraded.

Figure 4:
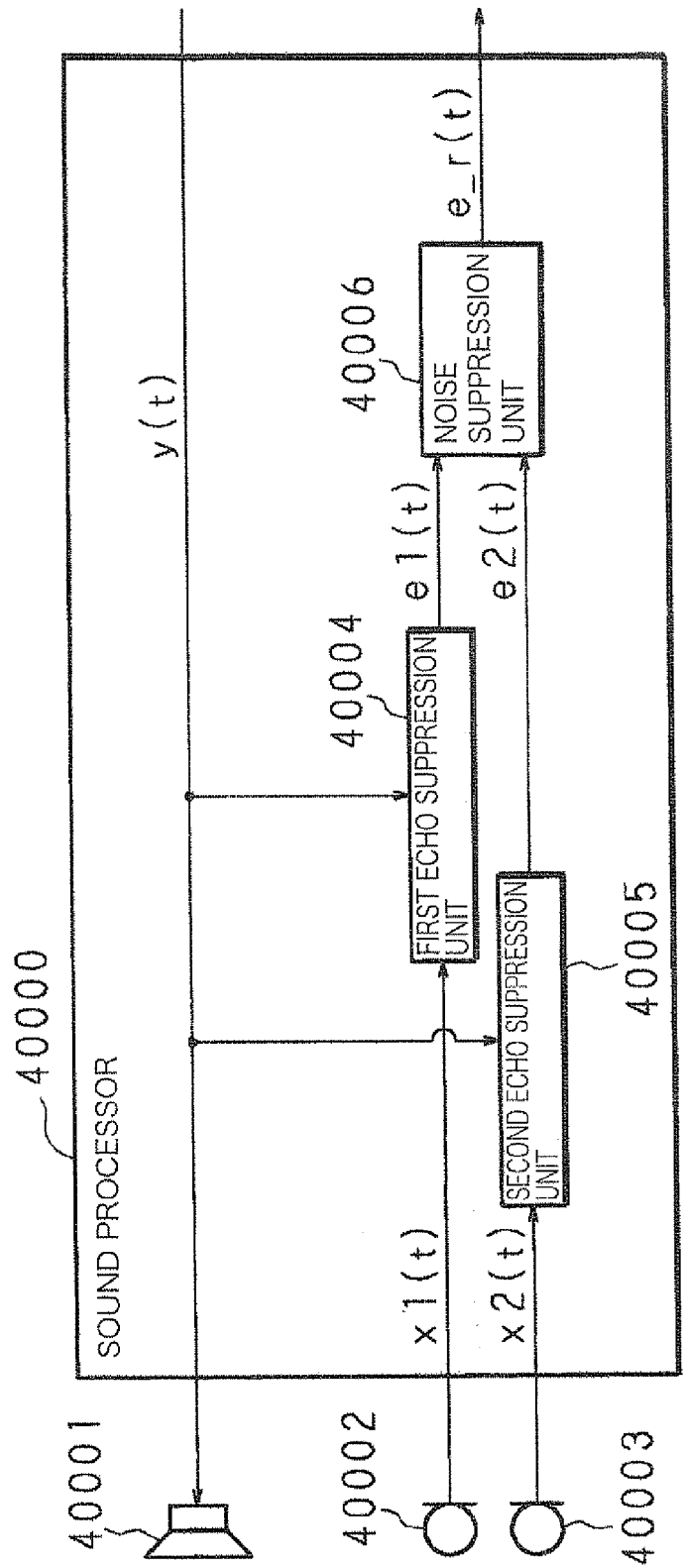
FIG. 4 is a block diagram illustrating the structure of another conventional sound processor.

Alternatively, in the apparatus in which ambient noise is suppressed on the basis of an arrival direction after suppressing echo as illustrated in FIG. 4, there arises a problem that a difference is caused between respective reference sound signals obtained after the echo suppression and hence the accuracy in suppressing echo in the echo suppressing process is ultimately degraded. Also, since ambient noise is suppressed on the basis of the distorted signal obtained after the echo suppression, there arises a problem that the tone quality is degraded.

Now, the embodiments will be described with reference to the accompanying drawings.

Embodiment 1

Figure 5:
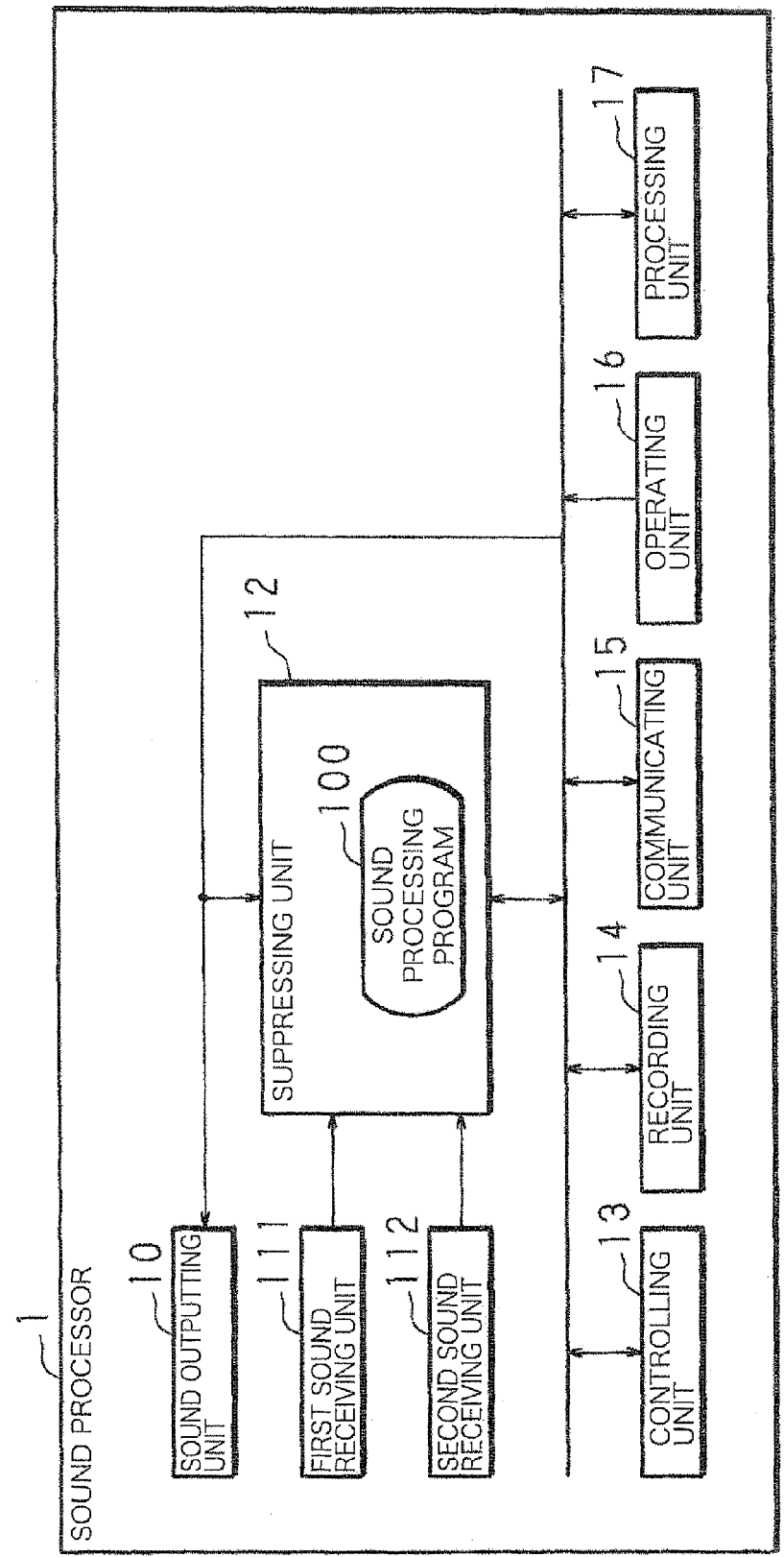
FIG. 5 is a block diagram illustrating an exemplary structure of a sound processor according to Embodiment 1 of the invention.

FIG. 5 is a block diagram illustrating an exemplary structure of a sound processor according to Embodiment 1 of the invention. In FIG. 5, a reference numeral 1 denotes a sound processor used as a system or an apparatus such as a videoconference system, a cellular phone or a car navigation system having a voice output/recognition function. The sound processor 1 includes a sound outputting unit 10 such as a speaker for outputting sound on the basis of a sound signal; a first sound receiving unit 111 and a second sound receiving unit 112 using a plurality of microphones such as a capacitor microphone for outputting a sound signal generated on the basis of input sound; and a suppressing unit 12 such as a DSP (Digital Signal Processor) into which firmware such as a sound processing program 100 of the invention and data are incorporated. A computer for a videoconference system, a cellular phone, a car navigation system or the like functions as the sound processor 1 of this invention by executing the sound processing program 100 of the invention incorporated into the suppressing unit 12.

The sound processor 1 further includes various units such as a controlling unit 13 of a CPU or the like for controlling the entire apparatus so as to execute various processing as the system or the apparatus such as a videoconference system, a cellular phone, a car navigation system or the like; a recording unit 14 of a ROM, a RAM, a hard disc or the like for recording various programs and data; a communicating unit 15 of an antenna, a communication port, control circuits for them, and the like; an operating unit 16 for accepting an operation from an operator; and a processing unit 17 constructed from hardware and/or software for executing various processing on a sound signal.

When the sound processor 1 is made to output sound based on a sound signal, such as a sound signal based on data recorded, for example, in the recording unit 14 or a sound signal based on data received from the communicating unit 15, the sound signal is output to the sound outputting unit 10. The sound signal output to the sound outputting unit 10 is also output to the suppressing unit 12. It is noted that the suppressing unit 12 executes various processing on a sound signal of a digital signal and that the sound outputting unit 10 outputs sound on the basis of a sound signal of an analog signal. Therefore, on a signal path for transmitting a sound signal, a converter circuit such as an A/D converter circuit not shown is provided. It is noted that the recording unit 14 may be appropriately designed so as to, for example, output a sound signal of a digital signal to the suppressing unit 12 and output a sound signal of an analog signal to the sound outputting unit 10.

Furthermore, the sound processor 1 generates a sound signal of an analog signal on the basis of sounds respectively received by the first sound receiving unit 111 and the second sound receiving unit 112. Then, the sound processor 1 amplifies the generated sound signal by an amplifier circuit such as a gain amplifier not shown, converts the amplified sound signal into a digital signal by sampling it with a sampling frequency of 8000 Hz or the like by an A/D converter circuit not shown, and outputs the sound signal having been converted into a digital signal to the suppressing unit 12.

The suppressing unit 12 executes processing, on the sound signal, for example, for suppressing an echo component or suppressing ambient noise on the basis of an arrival direction by executing the firmware such as the sound processing program 100.

Figure 6:
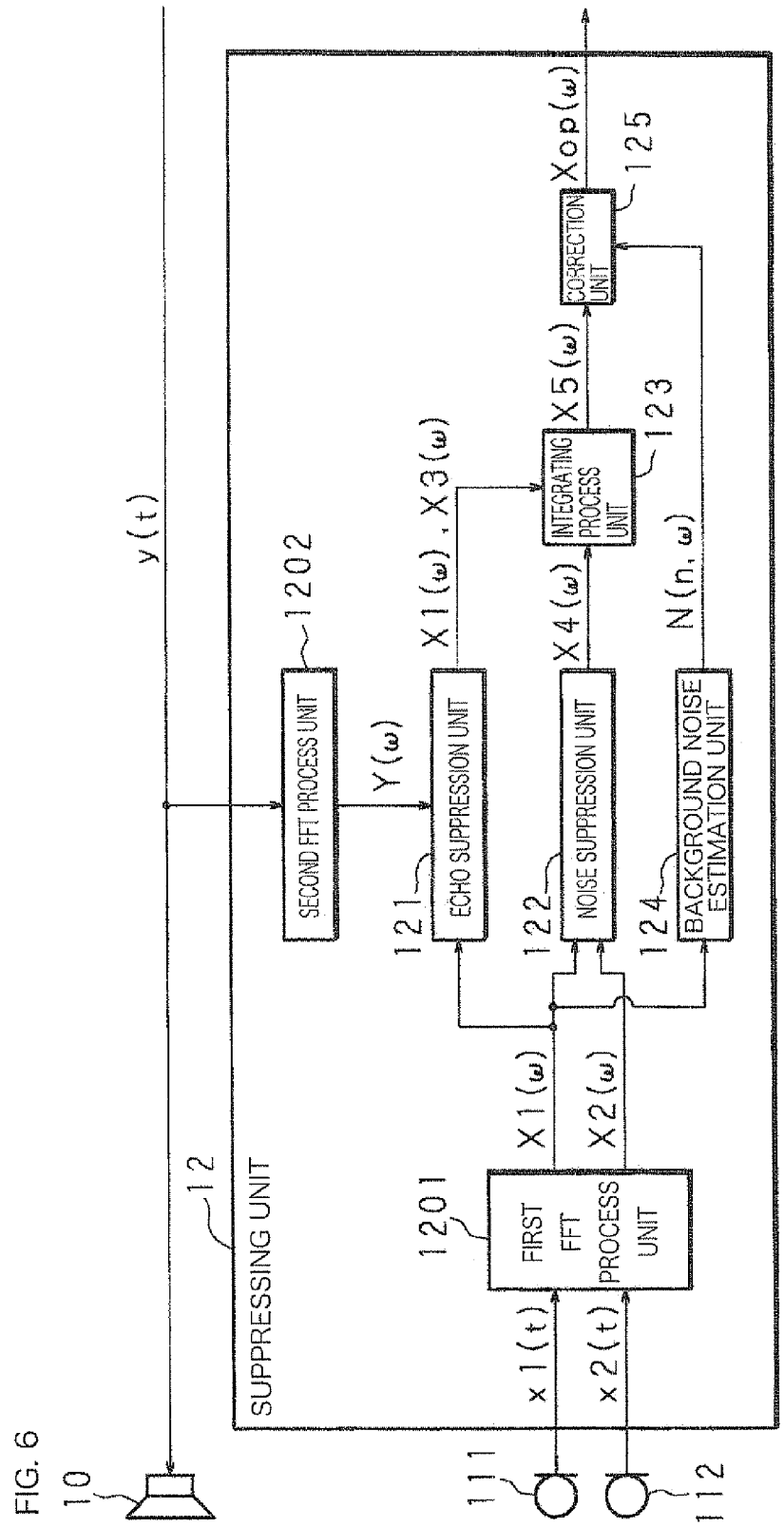
FIG. 6 is a functional block diagram illustrating an exemplary functional structure of units such as a suppressing unit included in the sound processor of Embodiment 1 of the invention.

FIG. 6 is a functional block diagram illustrating an exemplary functional structure of units such as the suppressing unit 12 included in the sound processor 1 of Embodiment 1 of the invention. The suppressing unit 12 generates, through execution of the sound processing program 100, various program modules such as a first FFT process unit 1201 and a second FFT process unit 1202 for performing an FFT (Fast Fourier Transformation) process on a sound signal; an echo suppression unit 121 for suppressing an echo component; a noise suppression unit 122 for suppressing ambient noise on the basis of an arrival direction; an integrating process unit 123 for integrating suppressing processes performed by the echo suppression unit 121 and the noise suppression unit 122; a background noise estimation unit 124 for estimating background noise; and a correction unit 125 for correcting a sound signal on the basis of background noise estimated by the background noise estimation unit 124. It is noted that the sound processor 1 of this invention is not limited to the structure exemplified in FIG. 6 but may be appropriately modified in the design, so as to, for example, incorporate the functions of the background noise estimation unit 124 and the correction unit 125 into the noise suppression unit 122.

The first FFT process unit 1201 accepts, as a first observation sound signal and a second observation sound signal, sound signals respectively received by the first sound receiving unit 111 and the second sound receiving unit 112 and converted into digital signals. The first FFT process unit 1201 generates first (second) observation sound signals of each frame composed of, for example, 512 samples of first (second) observation sound signals. Incidentally, respective frames overlap each other by approximately 128 through 256 samples, and each frame is subjected to frame processing generally performed in the field of voice recognition, such as a window function of Hamming window, Hanning window or the like, or filtering by using a high emphasis filter. The first FFT process unit 1201 performs the FFT process on the first observation sound signals and the second observation sound signals of each frame, so as to convert them into sound signals corresponding to spectra of components on a frequency axis. Then, the first FFT process unit 1201 passes the first observation sound signals having been converted into the spectra through the FFT process to the echo suppression unit 121, the noise suppression unit 122 and the background noise estimation unit 124. Furthermore, the first FFT process unit 1201 passes the second observation sound signals having been converted into the spectra through the FFT process to the noise suppression unit 122.

It is noted that the first observation sound signal and the second observation sound signal accepted by the first FFT process unit 1201 are respectively expressed as x1($t$) and x2($t$) in FIG. 6 and the description below. The parameter t corresponds to a sample number for specifying each sample used in converting a sound signal of an analog signal into a digital signal by sampling with a sampling frequency of 8000 Hz, 12000 Hz or the like. It is noted that the parameter t may be used as a parameter representing time. Furthermore, the spectrum of the first observation sound signal obtained after the FFT process is expressed as $X1(\omega)$ using a frequency $\omega$ as a parameter, and the spectrum of the second observation sound signal obtained after the FFT process is expressed as $X2(\omega)$. For convenience, the spectrum $X1(\omega)$ of the first observation sound signal is designated as the first observation sound signal $X1(\omega)$ and the spectrum $X2(\omega)$ of the second observation sound signal is designated as the second observation sound signal $X2(\omega)$ in the following description. It is noted that each of the spectra $X1(\omega)$ and $X2(\omega)$ is a complex number.

The second FFT process unit 1202 accepts, as reference sound signals, sound signals for making the sound outputting unit 10 output sound, divides the reference sound signals into respective frames, performs the FFT process on the reference sound signals of each frame and passes spectra of the reference sound signals thus converted through the FFT process to the echo suppression unit 121. In FIG. 6 and the following description, a reference sound signal accepted by the second FFT process unit 1202 is expressed as y(t). Also, the spectrum of the reference sound signal obtained through the FFT process is expressed as $Y(\omega)$. For convenience, the spectrum $Y(\omega)$ of the reference sound signal is designated as the reference sound signal $Y(\omega)$ in the following description. It is noted that the spectrum $Y(\omega)$ is a complex number.

Although the first FFT process unit 1201 and the second FFT process unit 1202 are herein described to have different structures, both of them may be integrated into one program module or the sound signal supplied from each of the first sound receiving unit 111 and the second sound receiving unit 112 may be provided with a dedicated FFT process unit.

The echo suppression unit 121 executes an echo suppressing process for removing echo derived from sound based on the reference sound signal $Y(\omega)$ from the first observation sound signal $X1(\omega)$, and passes the first observation sound signal $X1(\omega)$ and a spectrum $X3(\omega)$ of a third observation sound signal obtained by removing the echo from the first observation sound signal $X1(\omega)$ (hereinafter referred to as the third observation sound signal $X3(\omega)$) to the integrating process unit 123.

The noise suppression unit 122 estimates an arrival direction of sound of each frequency $\omega$ on the basis of a phase difference derived from a time difference in receiving sound between the first observation sound signal $X1(\omega)$ and the second observation sound signal $X2(\omega)$, executes a noise suppressing process for suppressing, as ambient noise, sound arriving from directions other than a target direction such as a direction of a speaking person, and passes a spectrum $X4(\omega)$ of a fourth observation sound signal in which the ambient noise has been suppressed (hereinafter referred to as the fourth observation sound signal $X4(\omega)$) to the integrating process unit 123.

The integrating process unit 123 accepts the first observation sound signal $X1(\omega)$ and the third observation sound signal $X3(\omega)$ from the echo suppression unit 121 and accepts the fourth observation sound signal $X4(\omega)$ from the noise suppression unit 122. The integrating process unit 123 calculates, in accordance with an expression (1) described below for calculating a spectral ratio between the first observation sound signal $X1(\omega)$ and the third observation sound signal $X3(\omega)$, echo suppression gain $g1(\omega)$, that is, a ratio in absolute values of each frequency component of the third observation sound signal $X3(\omega)$ to the first observation sound signal $X1(\omega)$. It is noted that $g1(f)=0$ at a frequency f where $|X1(\omega)|=0$ in the expression (1).

$$g1(\omega)=|X3(\omega)|/|X1(\omega)| \qquad \text{Expression (1)}$$

wherein g1(ω) indicates echo suppression gain, X3(ω) indicates a spectrum of the third observation sound signal and X1(ω) indicates a spectrum of the first observation sound signal.

Furthermore, the integrating process unit 123 generates a spectrum X5(ω) of a fifth observation sound signal obtained by subjecting the first observation sound signal X1(ω) to the echo suppressing process and the noise suppressing process (hereinafter referred to as the fifth observation sound signal X5(ω)) in accordance with an expression (2) described below for multiplying the fourth observation sound signal X4(ω) by the echo suppression gain g1(ω) calculated in accordance with the expression (1), and passes the fifth observation sound signal X5(ω) to the correction unit 125.

$$X5(\omega)=g1(\omega)\cdot X4(\omega) \qquad \text{Expression (2)}$$

wherein g1(ω) indicates echo suppression gain, X5(ω) indicates a spectrum of the fifth observation sound signal and X4(ω) indicates a spectrum of the fourth observation sound signal.

The background noise estimation unit 124 derives power N(n, ω) of background noise, that is, a real number, by smoothing, with respect to each frequency component, time change of power P(ω) of a spectrum obtained as a square of the absolute value of the first observation sound signal X1(ω) as represented by an expression (3) described below, and passes the power N(n, ω) of the background noise to the correction unit 125. It is noted that a frame number n is used as a parameter representing time in the expression (3). In other words, the power of a spectrum of the background noise at a frequency ω in the nth frame is expressed as N(n, ω). Alternatively, the power N(n, ω) of the spectrum of the background noise may be derived by using a common logarithm of a square of the absolute value of the first observation sound signal X1(ω).

$$N(n,\omega)=\alpha\cdot N(n-1,\omega)+(1-\alpha)\cdot P(\omega) \qquad \text{Expression (3)}$$

wherein n indicates a frame number; N(n, ω) indicates power of a spectrum of background noise at a frequency ω in the nth frame; α indicates a constant satisfying 0<α≦1; and P(ω) indicates power of a spectrum of the first observation sound signal at the frequency ω.

The correction unit 125 generates a spectrum Xop(ω) of an output sound signal (hereinafter referred to as the output sound signal Xop(ω)) by correcting the fifth observation sound signal X5(ω) accepted from the integrating process unit 123 on the basis of the power N(n, ω) of the background noise, and outputs the generated output sound signal Xop(ω) to the processing unit 17. The correction performed by the correction unit 125 is carried out by converting the value of the fifth observation sound signal X5(ω) while keeping the phase of the fifth observation sound signal X5(ω) so that a square root of the power (n, ω) of the background noise may accord with the absolute value of the fifth observation sound signal X5(ω) at a frequency ω where power P5(ω) obtained as a square of the absolute value of the fifth observation sound signal X5(ω) is smaller than the power N(n, ω) of the background noise. Owing to the correction performed by the correction unit 125, generation of unnatural sound such as musical noise derived from excessive suppression may be prevented.

The processing unit 17 executes acoustic processing such as voice recognition on the basis of the output sound signal Xop(ω). However, the acoustic processing performed by the processing unit 17 is not limited to the voice recognition. For example, the processing unit 17 executes acoustic processing for converting the output sound signal Xop(ω) into a sound signal on a time axis through an IFFT (inverse Fourier transformation) process and sending the resultant signal from the communicating unit 15, or further converting the resultant signal into an analog signal and outputting it from the sound outputting unit 10. Incidentally, a part or all of the functions related to the acoustic processing of the processing unit 17 may be realized by the suppressing unit 12 instead of providing the suppressing unit 12 and the processing unit 17 as the independent units.

Figure 7:
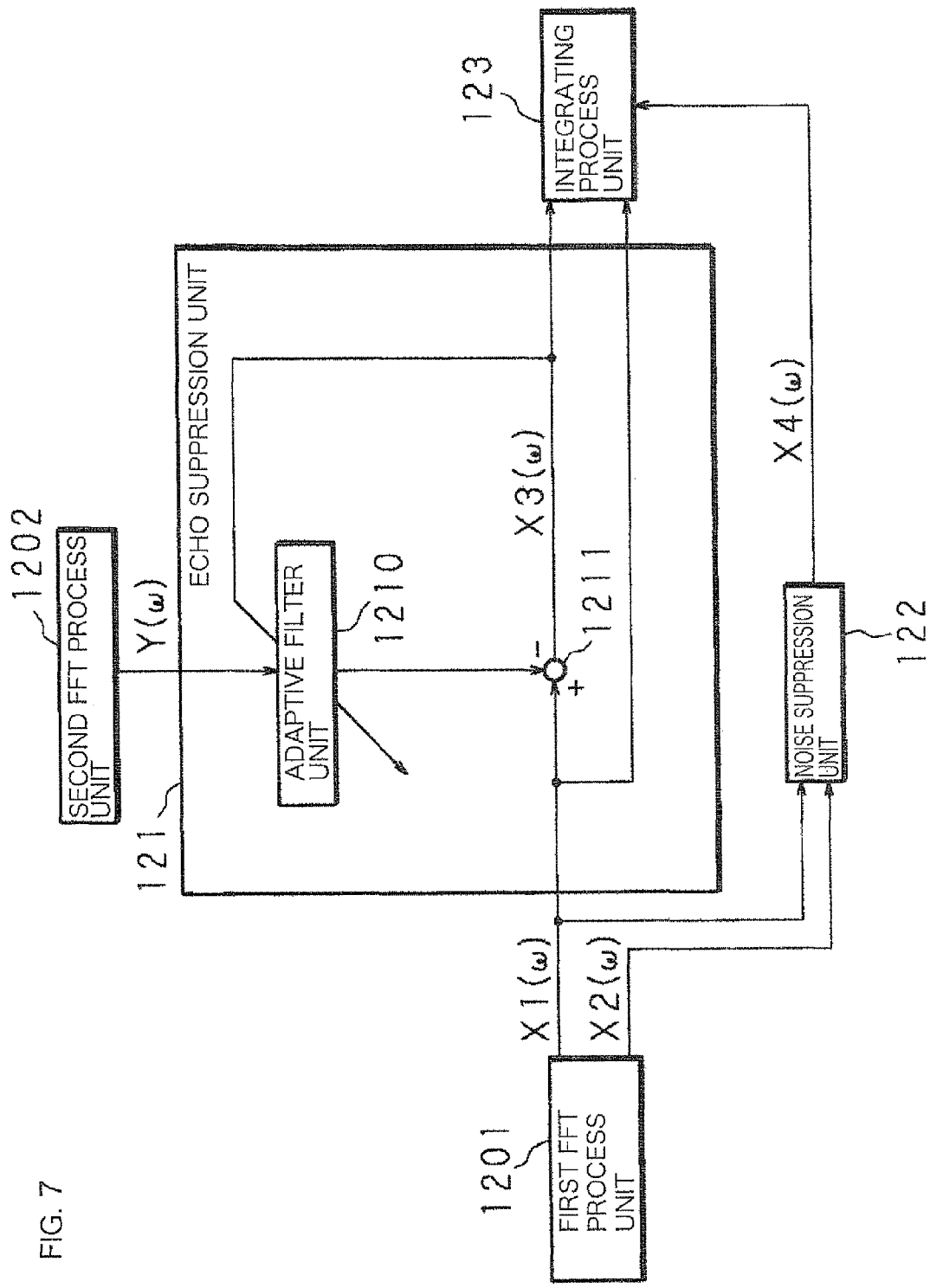
FIG. 7 is a functional block diagram illustrating an exemplary functional structure of an echo suppression unit and the like included in the sound processor of Embodiment 1 of the invention.

The echo suppression unit 121 functioning in the suppressing unit 12 will be described in more detail. FIG. 7 is a functional block diagram illustrating an exemplified functional structure of the echo suppression unit 121 and the like included in the sound processor 1 of Embodiment 1 of the invention. The echo suppression unit 121 includes various program modules such as an adaptive filter unit 1210 for estimating an echo component to be removed and a removal unit 1211, that is, a subtracter, for removing the estimated echo component from the first observation sound signal X1(ω).

The echo suppression unit 121 accepts the first observation sound signal X1(ω) from the first FFT process unit 1201 and accepts the reference sound signal Y(ω) from the second FFT process unit 1202.

The adaptive filter unit 1210 accepts the reference sound signal Y(ω) and the third observation sound signal X3(ω) obtained by removing echo from the first observation sound signal X1(ω). The adaptive filter unit 1210 adaptively calculates or updates a filter factor of each frequency ω on the basis of the reference sound signal Y(ω) and the third observation sound signal X3(ω) and filters the reference sound signal Y(ω) on the basis of the updated filter factor, so as to derive (estimate) an echo component to be removed. Then, the adaptive filter unit 1210 passes the echo component to the removal unit 1211.

The removal unit 1211 generates the third observation sound signal X3(ω) by subtracting the echo component from the first observation sound signal X1(ω). The third observation sound signal X3(ω) corresponds to a spectrum in which the echo component has been removed.

Thereafter, the echo suppression unit 121 passes the first observation sound signal X1(ω) accepted from the first FFT process unit 1201 and the third observation sound signal X3(ω) generated by the removal unit 1211 to the integrating process unit 123. The echo suppression performed by the echo suppression unit 121 may employ existing technique disclosed in Non-patent Document 1 or the like.

Figure 8:
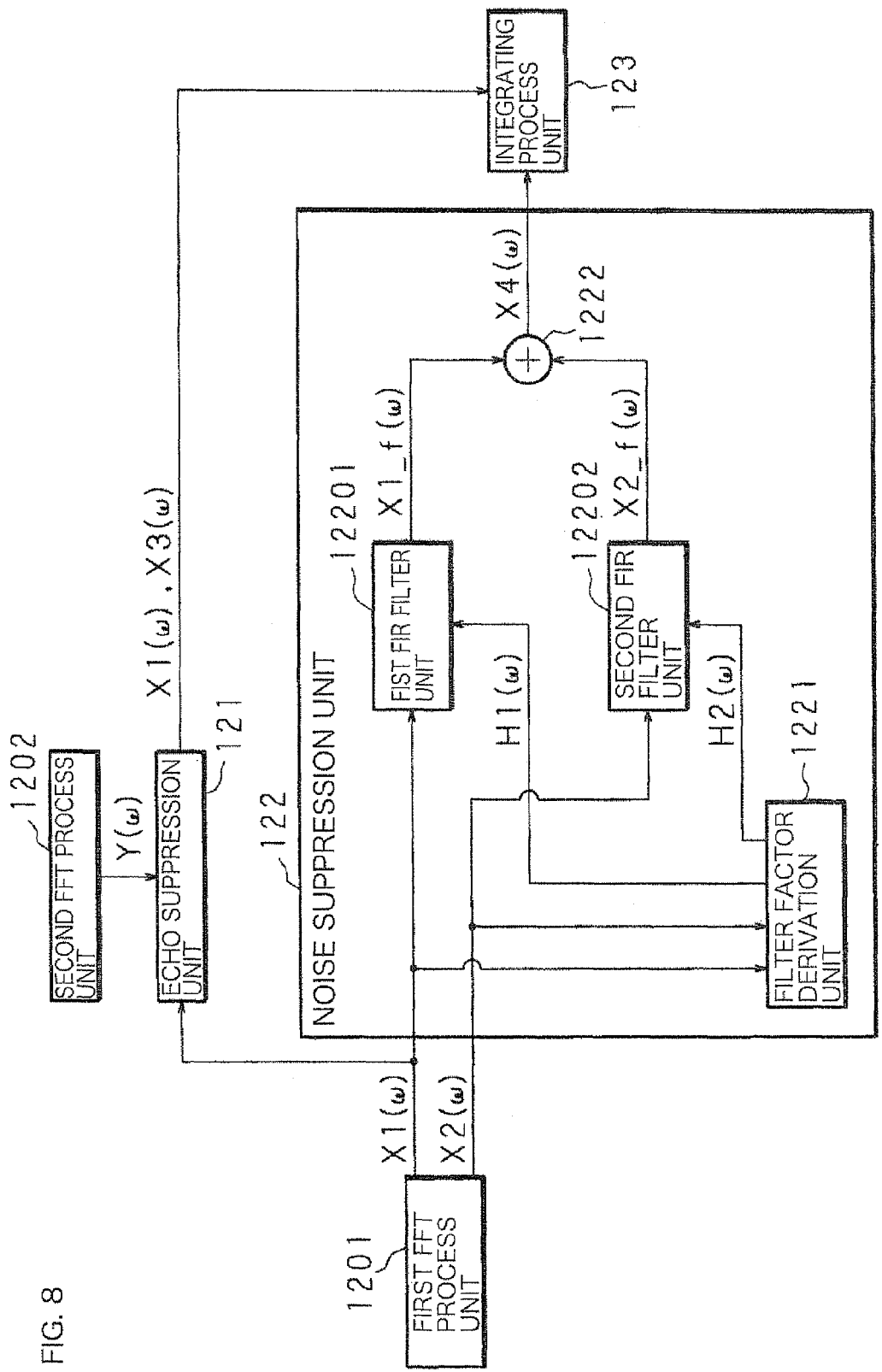
FIG. 8 is a functional block diagram illustrating an exemplary functional structure of a noise suppression unit and the like included in the sound processor of Embodiment 1 of the invention.

The noise suppression unit 122 functioning in the suppressing unit 12 will be described in more detail. FIG. 8 is a functional block diagram illustrating an exemplary functional structure of the noise suppression unit 122 and the like included in the sound processor 1 of Embodiment 1 of the invention. The noise suppression unit 122 includes various program modules such as a first FIR (Finite Impulse Response) filter unit 12201 and a second FIR filter unit 12202 for respectively filtering the first observation sound signal X1(ω) and the second observation sound signal X2(ω), a filter factor derivation unit 1221 for deriving a filter factor, and a suppression unit 1222, that is, an adder, for suppressing ambient noise.

The noise suppression unit 122 accepts the first observation sound signal X1(ω) and the second observation sound signal X2(ω) from the first FFT process unit 1201.

The first FIR filter unit 12201 filters the first observation sound signal X1(ω) on the basis of a first filter factor H1(ω) set therein and passes a first observation sound signal X1_f(ω) resulting from the filtering to the suppression unit 1222.

The second FIR filter unit 12202 filters the second observation sound signal $X2(\omega)$ on the basis of a second filter factor $H2(\omega)$ set therein and passes a second observation sound signal $X2\_f(\omega)$ resulting from the filtering to the suppression unit 1222.

The filter factor derivation unit 1221 derives the first filter factor $H1(\omega)$ and the second filter factor $H2(\omega)$ respectively on the basis of the first observation sound signal $X1(\omega)$ and the second observation sound signal $X2(\omega)$ and passes the derived first filter factor $H1(\omega)$ to the first FIR filter unit 12201 and the second filter factor $H2(\omega)$ to the second FIR filter unit 12202. The first FIR filter unit 12201 and the second FIR filter unit 12202 respectively set the first filter factor $H1(\omega)$ and the second filter factor $H2(\omega)$ thus accepted.

The suppression unit 1222 generates the fourth observation sound signal $X4(\omega)$ in which sound arriving from directions other than the target direction such as the direction of a speaking person is suppressed as the ambient noise by summing up the filtered first observation sound signal $X1\_f(\omega)$ and the filtered second observation sound signal $X2\_f(\omega)$.

Then, the noise suppression unit 122 passes the fourth observation sound signal $X4(\omega)$ generated by the suppression unit 1222 to the integrating process unit 123. In this manner, in the noise suppression unit 122, the arrival direction of sound of each frequency component is estimated by the filter factor derivation unit 1221 on the basis of a phase difference between the first observation sound signal $X1(\omega)$ and the second observation sound signal $X2(\omega)$, and the first FIR filter unit 12201, the second FIR filter unit 12202, the filter factor derivation unit 1221 and the suppression unit 1222 together cooperatively work to execute the processing for suppressing the ambient noise. As this processing, existing technique disclosed in Non-patent Document 1 or the like may be applied. Incidentally, although the method for suppressing sound with a frequency component estimated to have arrived from a direction other than the target direction is exemplarily described as the method for suppressing the ambient noise, sound with a frequency component estimated to have arrived from the target direction may be enhanced instead.

Figure 9:
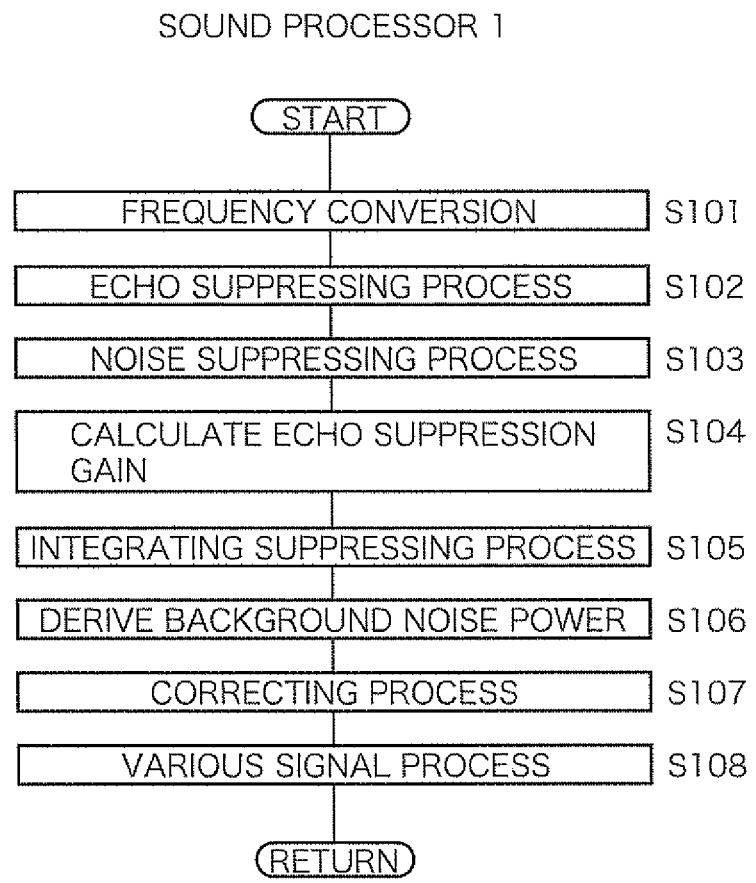
FIG. 9 is a flowchart illustrating an example of processing performed by the sound processor of Embodiment 1 of the invention.

Next, the processing performed by the sound processor 1 of Embodiment 1 of the invention will be described. FIG. 9 is a flowchart illustrating an example of the processing performed by the sound processor 1 of Embodiment 1 of the invention. The sound processor 1 outputs, to the suppressing unit 12, a sound signal corresponding to a base of sound to be output from the sound outputting unit 10, and outputs a sound signal further to the sound outputting unit 10. Also, the sound processor 1 outputs sound signals, which are generated respectively by the first sound receiving unit 111 and the second sound receiving unit 112 on the basis of sound input thereto, to the suppressing unit 12.

Through the processing performed by the first FFT process unit 1201 and the second FFT process unit 1202, the suppressing unit 12 of the sound processor 1 frames accepted sound signals and converts the framed sound signals into spectra respectively corresponding to components on the frequency axis (S101). In S101, the first FFT process unit 1201 converts a first observation sound signal $x1(t)$ based on sound input from the first sound receiving unit 111 and a second observation sound signal $x2(t)$ based on sound input from the second sound receiving unit 112 into components on the frequency axis. In S101, the second FFT process unit 1201 converts a reference sound signal $y(t)$ corresponding to a base of sound to be output from the sound outputting unit 10 into a component on the frequency axis. A method for converting the signals into the components on the frequency axis employed in S101 is not necessarily limited to that using the FFT but may be another converting method employing DCT (Discrete Cosine Transform) or the like.

Through the processing performed by the echo suppression unit 121, the suppressing unit 12 of the sound processor 1 accepts a first observation sound signal $X1(\omega)$ and a reference sound signal $Y(\omega)$ corresponding to the converted components on the frequency axis, estimates an echo component derived from sound based on the reference sound signal $Y(\omega)$, executes an echo suppressing process for removing the estimated echo component from the first observation sound signal $X1(\omega)$ (S102), and passes the first observation sound signal $X1(\omega)$ and a third observation sound signal $X3(\omega)$ obtained by removing the echo from the first observation sound signal $X1(\omega)$ to the integrating process unit 123.

Through the processing performed by the noise suppression unit 122, the suppressing unit 12 of the sound processor 1 estimates an arrival direction of each frequency $\omega$ of the sound on the basis of a phase difference between the first observation sound signal $X1(\omega)$ and the second observation sound signal $X2(\omega)$, executes a noise suppressing process for suppressing ambient noise arriving from directions other than a target direction (S103), and passes a fourth observation sound signal $X4(\omega)$ with ambient noise suppressed to the integrating process unit 123. Incidentally, although the respective processings are described to be performed one after another for convenience, the processing of S102 and S103 are executed substantially in parallel to each other.

Through the processing performed by the integrating process unit 123, the suppressing unit 12 of the sound processor 1 calculates, in accordance with the aforementioned expression (1), echo suppression gain $g1(\omega)$, that is, a ratio in absolute values of each frequency component of the third observation sound signal $X3(\omega)$ to the first observation sound signal $X1(\omega)$ (S104).

Furthermore, through the processing performed by the integrating process unit 123, the suppressing unit 12 of the sound processor 1 executes an integrating suppressing process for generating a fifth observation sound signal $X5(\omega)$ by multiplying the fourth observation sound signal $X4(\omega)$ by the echo suppression gain $g1(\omega)$ in accordance with the aforementioned expression (2) (S105), and passes the generated fifth observation sound signal $X5(\omega)$ to the correction unit 125. The fifth observation sound signal $X5(\omega)$ generated in S105 corresponds to a spectrum obtained by subjecting the first observation sound signal $X1(\omega)$ to the echo suppressing process and the noise suppressing process and is in the same phase as the fourth observation sound signal $X4(\omega)$.

Furthermore, through the processing performed by the background noise estimation unit 124, the suppressing unit 12 of the sound processor 1 derives, in accordance with the aforementioned expression (3), power $N(n, \omega)$ of background noise by smoothing, with respect to each frequency component, time change of power $P(\omega)$ obtained as a square of the absolute value of the first observation sound signal $X1(\omega)$ (S106), and passes the power $N(n, \omega)$ of the background noise to the correction unit 125. Incidentally, although the respective processings are described to be performed one after another for convenience, the processing of S106 is executed substantially in parallel to the processing of S102 and S103.

Through the processing performed by the correction unit 125, the suppressing unit 12 of the sound processor 1 executes a correcting process for generating an output sound signal $Xop(\omega)$ by correcting the fifth observation sound signal $X5(\omega)$ on the basis of the power $N(n, \omega)$ of the background noise (S107), and outputs the generated output sound signal $Xop(\omega)$ to the processing unit 17.

Thereafter, the processing unit 17 of the sound processor 1 executes the acoustic processing such as voice recognition on the basis of the output sound signal Xop(ω), the IFFT process for converting the output sound signal Xop(ω) into a sound signal on the time axis, or various signal processing such as processing for outputting and transmitting the output sound signal as sound (S108).

In this manner, in the sound processor 1 of Embodiment 1 of the invention, the echo suppressing process and the noise suppressing process are executed independently of each other, and the integrating suppressing process using the results of the echo suppressing process and the noise suppressing process is performed, and hence, signals free from distortion are used both in the echo suppressing process and the noise suppressing process, so that echo and ambient noise may be suppressed with a high degree of accuracy while retaining the tone quality.

Although the correction is performed on the basis of the power of the background noise estimated by the background noise estimation unit in Embodiment 1, the invention is not limited to this but may be expanded to various form, in which, for example, the processing is simplified so as not to perform the correction based on the power of the background noise.

Although the echo suppression unit passes the first observation sound signal and the third observation sound signal to the integrating process unit so as to calculate the echo suppression gain by the integrating process unit in Embodiment 1, the invention is not limited to this but may be expanded to form in which the echo suppression gain is calculated by the echo suppression unit.

Figure 10:
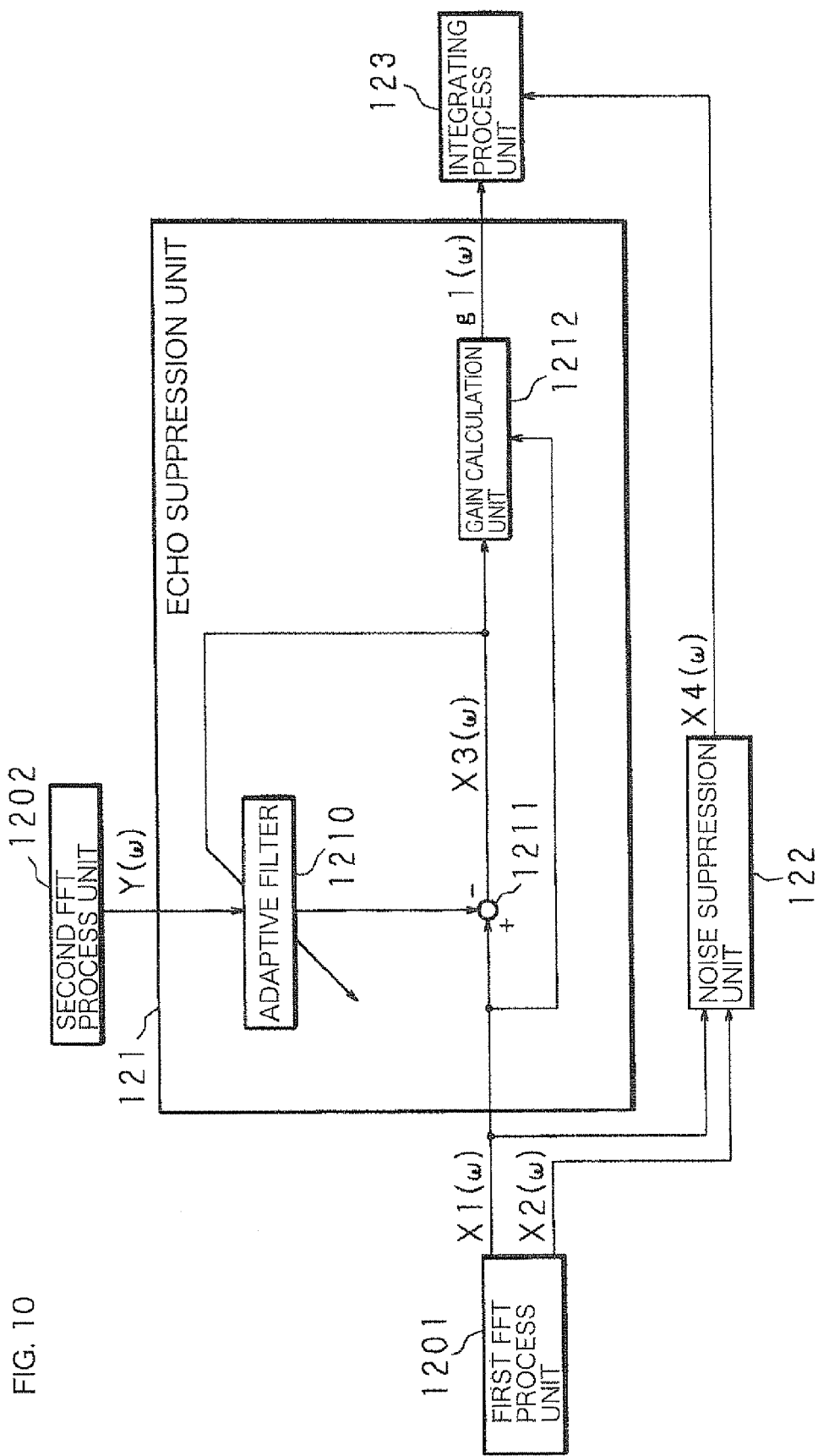
FIG. 10 is a functional block diagram illustrating another exemplary functional structure of the echo suppression unit and the like included in the sound processor of Embodiment 1 of the invention.

FIG. 10 is a functional block diagram illustrating an exemplary functional structure of the echo suppression unit 121 and the like included in the sound processor 1 according to Embodiment 1 of the invention. FIG. 10 illustrates an exemplary structure of the echo suppression unit 121 employed when the echo suppression gain g1(ω) is calculated by the echo suppression unit 121. The echo suppression unit 121 of FIG. 10 includes various program modules such as an adaptive filter unit 1210, a removal unit 1211, and a gain calculation unit 1212 for calculating the echo suppression gain g1(ω), that is, a spectral ratio between the first observation sound signal X1(ω) and the third observation sound signal X3(ω).

The gain calculation unit 1212 accepts the first observation sound signal X1(ω) from the first FFT process unit 1201 and the third observation sound signal X3(ω) from the removal unit 1211. Then, the gain calculation unit 1212 calculates, in accordance with the aforementioned expression (1), the echo suppression gain g1(ω), that is, a ratio in absolute values of each frequency component of the third observation sound signal X3(ω) to the first observation sound signal X1(ω).

Then, the echo suppression unit 121 passes the echo suppression gain g1(ω) calculated by the gain calculation unit 1212 to the integrating process unit 123.

In this manner, in the sound processor 1 of Embodiment 1 of the invention, the calculation processing of the echo suppression gain g1(ω) by the integrating process unit 123 may be replaced by calculating the echo suppression gain g1(ω) by the echo suppression unit 121. In this case, the processing of S104 of the flowchart of FIG. 9 is executed not by the integrating process unit 123 but by the echo suppression unit 121.

Furthermore, although the echo and the ambient noise are suppressed by calculating a product of the ratio of each frequency component between the observation sound signals obtained before and after the echo suppression and the observation sound signal obtained after suppressing the ambient noise in Embodiment 1, the invention is not limited to this but may be expanded to form where the echo and the ambient noise are suppressed by calculating a product of a ratio of each frequency component between observation sound signals obtained before and after the noise suppression and an observation sound signal obtained after suppressing the echo.

Figure 11:
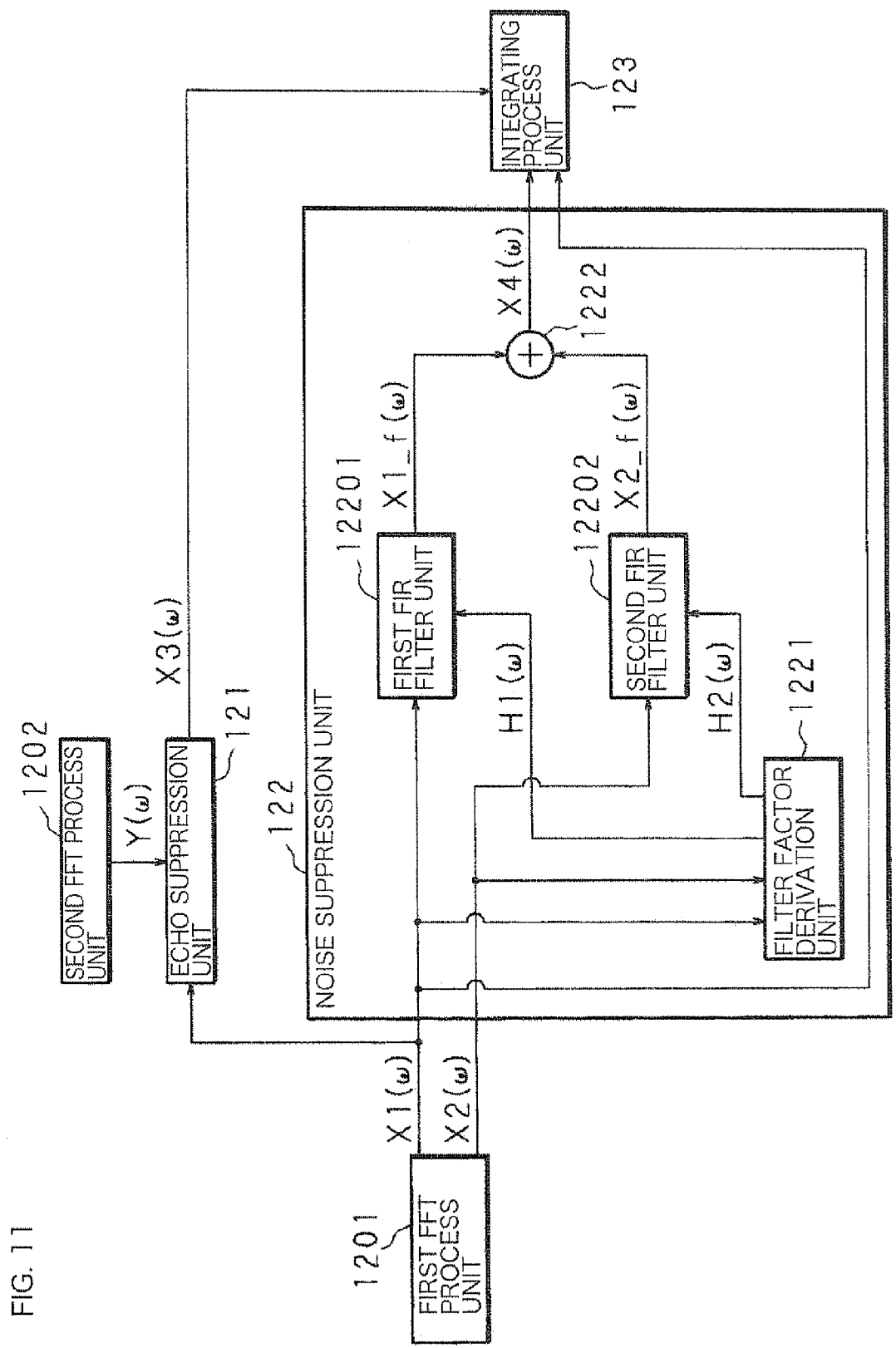
FIG. 11 is a functional block diagram illustrating another exemplary functional structure of the noise suppression unit and the like included in the sound processor of Embodiment 1 of the invention.

FIG. 11 is a functional block diagram illustrating an exemplary functional structure of the noise suppression unit 122 and the like included in the sound processor 1 according to Embodiment 1 of the invention. The noise suppression unit 122 of FIG. 11 accepts the first observation sound signal X1(ω) and the second observation sound signal X2(ω) from the first FFT process unit 1201 and executes a noise suppressing process for generating a fourth observation sound signal X4(ω) with ambient noise suppressed.

Then, the noise suppression unit 122 passes the first observation sound signal X1(ω) accepted from the first FFT process unit 1201 and the generated fourth observation sound signal X4(ω) to the integrating process unit 123. It is noted that the echo suppression unit 121 passes the third observation sound signal X3(ω) alone to the integrating process unit 123.

The integrating process unit 123 employed in using the noise suppression unit 122 of FIG. 11 will be described. The integrating process unit 123 accepts the third observation sound signal X3(ω) from the echo suppression unit 121, and accepts the first observation sound signal X1(ω) and the fourth observation sound signal X4(ω) from the noise suppression unit 122. The integrating process unit 123 calculates noise suppression gain g2(ω), that is, a ratio in absolute values of each frequency component of the fourth observation sound signal X4(ω) to the first observation sound signal X1(ω) in accordance with an expression (4) described below for calculating a spectral ratio between the first observation sound signal X1(ω) and the fourth observation sound signal X4(ω). It is noted that g2(f)=0 at a frequency f where |X1(ω)|=0 in the expression (4).

$$g2(\omega)=|X4(\omega)|/|X1(\omega)| \quad \text{Expression (4)}$$

wherein g2(ω) indicates noise suppression gain, X4(ω) indicates a spectrum of the fourth observation sound signal and X1(ω) indicates a spectrum of the first observation sound signal.

Furthermore, the integrating process unit 123 generates a fifth observation sound signal X5(ω) obtained by subjecting the first observation sound signal X1(ω) to the echo suppressing process and the noise suppressing process in accordance with an expression (5) described below for multiplying the third observation sound signal X3(ω) by the noise suppression gain g2(ω) calculated in accordance with the expression (4). The generated fifth observation sound signal X5(ω) is passed to the correction unit 125.

$$X5(\omega)=g2(\omega) \cdot X3(\omega) \quad \text{Expression (5)}$$

wherein g2(ω) indicates noise suppression gain, X5(ω) indicates a spectrum of the fifth observation sound signal and X3(ω) indicates a spectrum of the third observation sound signal.

In this manner, when the noise suppression gain g2(ω) is used, the processing of S104 of the flowchart of FIG. 9 is performed as calculation of the noise suppression gain g2(ω). Also in this case, the fifth observation sound signal X5(ω) is a sound signal obtained by subjecting the first observation sound signal X1(ω) to the echo suppressing process and the noise suppressing process and is in the same phase as the third observation sound signal X3(ω). It is noted that the noise suppression unit 122 may calculate the noise suppression gain $g2(\omega)$ and pass the noise suppression gain $g2(\omega)$ to the integrating process unit 123.

It is noted that the noise suppression gain $g2(\omega)$ may be calculated not in accordance with the expression (4) but in accordance with the following expression (4'):

$$g2(\omega)=|X4(\omega)|/|X2(\omega)| \quad \text{Expression (4')}$$

wherein $g2(\omega)$ indicates noise suppression gain, $X4(\omega)$ indicates a spectrum of the fourth observation sound signal and $X2(\omega)$ indicates a spectrum of the second observation sound signal.

Furthermore, Embodiment 1 may be expanded to form in which echo and ambient noise are suppressed by using echo suppression gain and noise suppression gain.

The integrating process unit 123 or the echo suppression unit 121 calculates the echo suppression gain $g1(\omega)$ in accordance with the aforementioned expression (1). Furthermore, the integrating process unit 123 or the noise suppression unit 122 calculates noise suppression gain $g2(\omega)$ in accordance with the aforementioned expression (4).

Then, the integrating process unit 123 generates a fifth observation sound signal $X5(\omega)$ obtained by subjecting the first observation sound signal $X1(\omega)$ to the echo suppressing process and the noise suppressing process in accordance with an expression (6) described below for multiplying the first observation sound signal $X1(\omega)$ by the echo suppression gain $g1(\omega)$ and the noise suppression gain $g2(\omega)$. The generated fifth observation sound signal $X5(\omega)$ is passed to the correction unit 125.

$$X5(\omega)=g1(\omega) \cdot g2(\omega) \cdot X1(\omega) \quad \text{Expression (6)}$$

wherein $g1(\omega)$ indicates echo suppression gain, $g2(\omega)$ indicates noise suppression gain, $X5(\omega)$ indicates a spectrum of the fifth observation sound signal and $X1(\omega)$ indicates a spectrum of the first observation sound signal.

In this manner, when the echo suppression gain $g1(\omega)$ and the noise suppression gain $g2(\omega)$ are used, the processing of S104 of the flowchart of FIG. 9 is performed as calculation of the echo suppression gain $g1(\omega)$ and the noise suppression gain $g2(\omega)$. Also in this case, the fifth observation sound signal $X5(\omega)$ is a sound signal obtained by subjecting the first observation sound signal $X1(\omega)$ to the echo suppressing process and the noise suppressing process and is in the same phase as the first observation sound signal $X1(\omega)$.

Embodiment 2

In Embodiment 2, the echo suppression gain calculated by the echo suppression unit in Embodiment 1 is also used in the noise suppression unit. In the following description, like reference numerals are used to refer to like elements used in Embodiment 1, so as to omit the detailed description. The exemplary structure of a sound processor 1 of Embodiment 2 is similar to that of Embodiment 1 described with reference to FIG. 5, and therefore, the description is omitted by referring to Embodiment 1.

Figure 12:
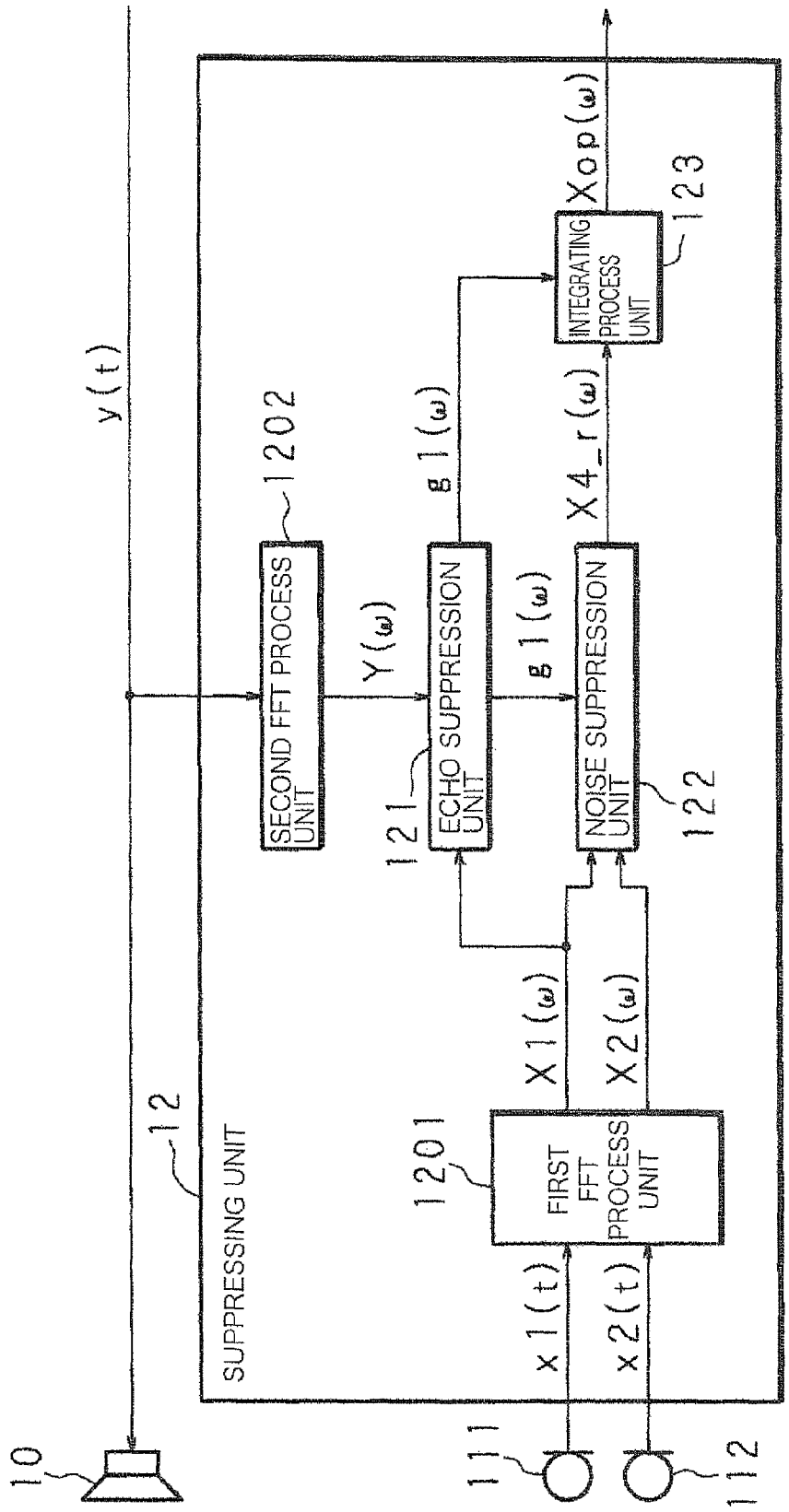
FIG. 12 is a functional block diagram illustrating an exemplary functional structure of units such as a suppressing unit included in a sound processor according to Embodiment 2 of the invention.

FIG. 12 is a functional block diagram illustrating an exemplary structure of units such as a suppressing unit 12 included in the sound processor 1 according to Embodiment 2 of the invention. The suppressing unit 12 generates, through execution of a sound processing program 100, various program modules such as a first FFT process unit 1201 and a second FFT process unit 1202, an echo suppression unit 121, a noise suppression unit 122 and an integrating process unit 123. Incidentally, the function of the background noise estimation unit for estimating background noise and the function of the correction unit for correcting a sound signal on the basis of the estimated background noise are incorporated into the noise suppression unit 122 in Embodiment 2.

The echo suppression unit 121 of Embodiment 2 corresponds to the echo suppression unit 121 of Embodiment 1 illustrated in FIG. 10. Specifically, the echo suppression unit 121 of Embodiment 2 accepts a first observation sound signal $X1(\omega)$ and a reference sound signal $Y(\omega)$ and calculates echo suppression gain $g1(\omega)$, that is, a ratio of each frequency component between observation sound signals obtained before and after echo suppression. It is noted that the echo suppression unit 121 of Embodiment 2 passes the calculated echo suppression gain $g1(\omega)$ to the integrating process unit 123 and passes the echo suppression gain $g1(\omega)$ also to the noise suppression unit 122.

The noise suppression unit 122 executes a noise suppressing process on the basis of the first observation sound signal $X1(\omega)$ and a second observation sound signal $X2(\omega)$ so as to generate a fourth observation sound signal $X4(\omega)$ with ambient noise suppressed. Furthermore, the noise suppression unit 122 estimates background noise in consideration of the echo suppression gain $g1(\omega)$ accepted from the echo suppression unit 121, corrects the fourth observation sound signal $X4(\omega)$ on the basis of the estimated background noise, and passes a corrected fourth observation sound signal $X4\_r(\omega)$ to the integrating process unit 123.

Figure 13:
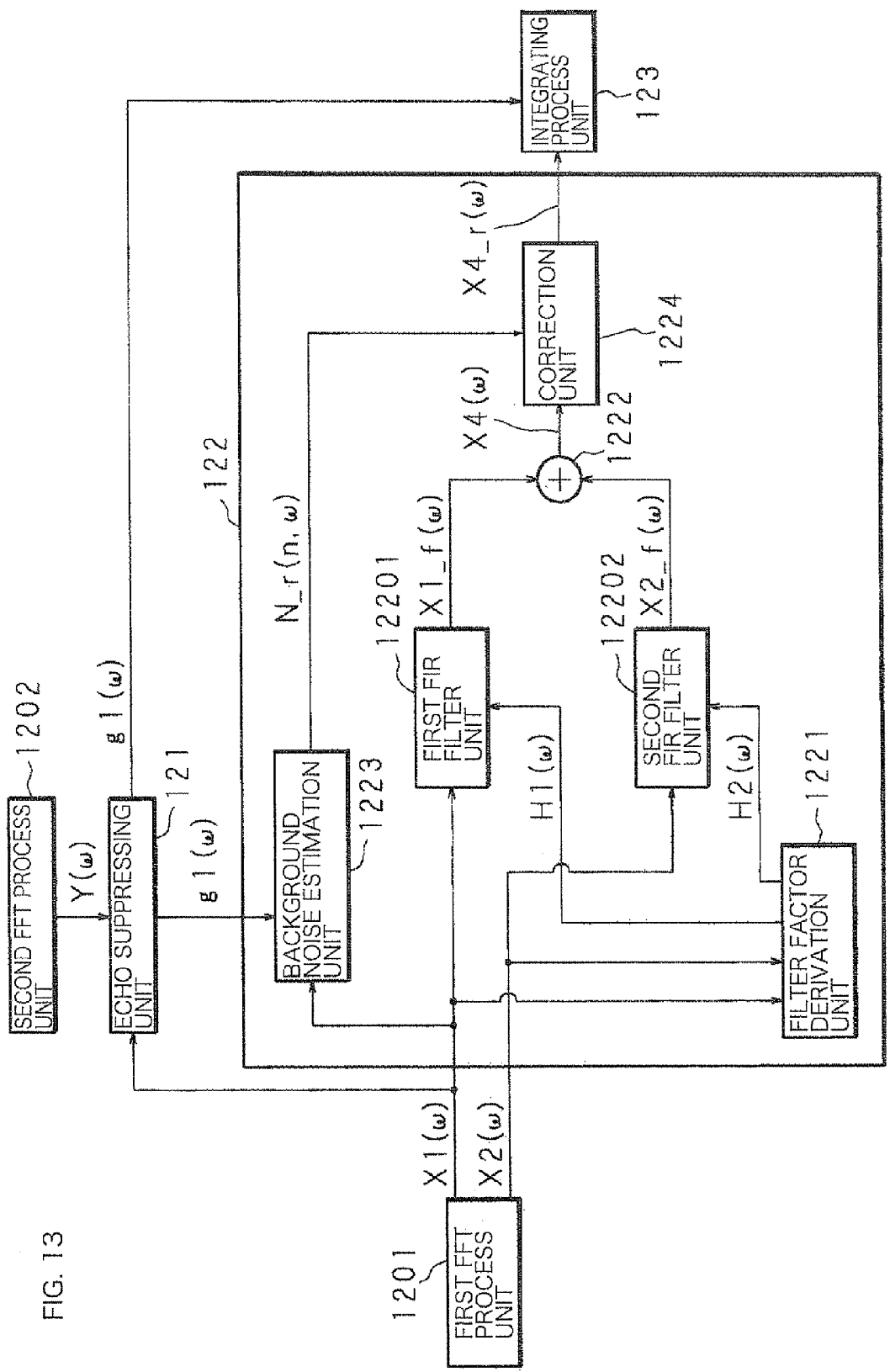
FIG. 13 is a functional block diagram illustrating an exemplary functional structure of a noise suppression unit and the like included in the sound processor of Embodiment 2 of the invention.

The noise suppression unit 122 functioning in the suppressing unit 12 will be described in more detail. FIG. 13 is a functional block diagram illustrating an exemplary structure of the noise suppression unit 122 and the like included in the sound processor 1 of Embodiment 2 of the invention. The noise suppression unit 122 includes various program modules such as a first FIR filter unit 12201 and a second FIR filter unit 12202, a filter factor derivation unit 1221, a suppression unit 1222, a background noise estimation unit 1223 and a correction unit 1224.

The noise suppression unit 122 accepts the first observation sound signal $X1(\omega)$ and the second observation sound signal $X2(\omega)$ from the first FFT process unit 1201 and accepts the echo suppression gain $g1(\omega)$ from the echo suppression unit 121.

The suppression unit 1222 passes the fourth observation sound signal $X4(\omega)$ with the ambient noise suppressed to the correction unit 1224.

The background noise estimation unit 1223 accepts the first observation sound signal $X1(\omega)$ from the first FFT process unit 1201 and accepts the echo suppression gain $g1(\omega)$ from the echo suppression unit 121. Then, the background noise estimation unit 1223 derives power $N(n, \omega)$ of the background noise by smoothing, with respect to each frequency component, time change of power $P(\omega)$ of a spectrum obtained as a square of the absolute value of the first observation sound signal $X1(\omega)$ in accordance with the expression (3) described in Embodiment 1. Furthermore, the background noise estimation unit 1223 calculates power $N\_r(n, \omega)$ of the background noise with echo suppressed by multiplying the power $N(n, \omega)$ of the background noise by the echo suppression gain $g1(\omega)$ in accordance with an expression (7) described below. Thereafter, the background noise estimation unit 1223 passes the power $N\_r(n, \omega)$ of the background noise with echo suppressed to the correction unit 1224.

$$N\_r(n,\omega)=g1(\omega) \cdot N(n,\omega) \quad \text{Expression (7)}$$

wherein $N\_r(n, \omega)$ indicates power of a spectrum of background noise with echo suppressed at a frequency $\omega$ in the nth frame; g1(ω) indicates echo suppression gain; and N(n, ω) indicates power of a spectrum of the background noise at the frequency ω in the nth frame.

The correction unit 1224 generates the corrected fourth observation sound signal X4_r(ω) by correcting the fourth observation sound signal X4(ω) accepted from the suppression unit 1222 on the basis of the power N_r(n, ω) of the background noise with echo suppressed. The correction performed by the correction unit 1224 is carried out by converting the value of the fourth observation sound signal X4(ω) while retaining the phase of the fourth observation sound signal X4(ω) so that a square root of the power N_r(n, ω) of the background noise may accord with the absolute value of the fourth observation sound signal X4(ω) at the frequency ω where power P4(ω) obtained as a square of the absolute value of the fourth observation sound signal X4(ω) is smaller than the power N_r(n, ω) of the background noise.

Then, the noise suppression unit 122 passes the corrected fourth observation sound signal X4_r(ω) generated by the correction unit 1224 to the integrating process unit 123.

The integrating process unit 123 accepts the echo suppression gain g1(ω) from the echo suppression unit 121 and accepts the corrected fourth observation sound signal X4_r(ω) from the noise suppression unit 122. The integrating process unit 123 generates a fifth observation sound signal X5(ω) by multiplying the corrected fourth observation sound signal X4_r(ω) by the echo suppression gain g1(ω) as expressed by an expression (8) described below. The fifth observation sound signal X5(ω) is output to the processing unit 17 as the output sound signal Xop(ω).

$$X5(\omega) = g1(\omega) \cdot X4\_r(\omega) \quad \text{Expression (8)}$$

wherein g1(ω) indicates echo suppression gain; X5(ω) indicates a spectrum of the fifth observation sound signal; and X4_r(ω) indicates a spectrum of the corrected fourth observation sound signal.

Figure 14:
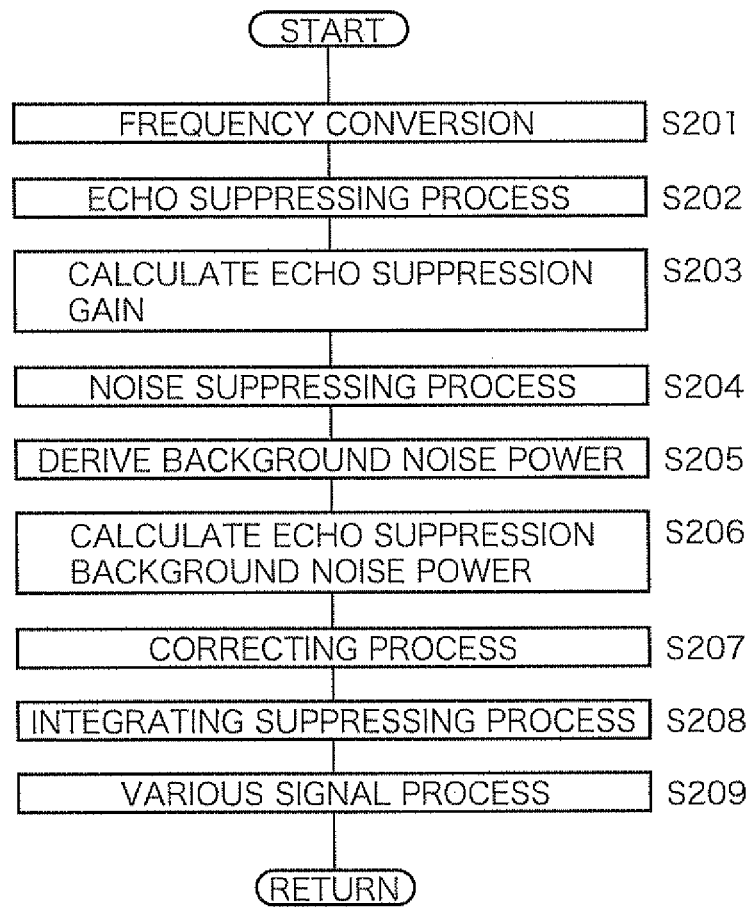
FIG. 14 is a flowchart illustrating an example of processing performed by the sound processor of Embodiment 2 of the invention.

Next, the processing performed by the sound processor 1 of Embodiment 2 of the invention will be described. FIG. 14 is a flowchart illustrating an example of the processing performed by the sound processor 1 of Embodiment 2 of the invention. Through the processing performed by the first FFT process unit 1201 and the second FFT process unit 1202, the suppressing unit 12 of the sound processor 1 frames accepted sound signals and converts the framed sound signals into spectra respectively corresponding to components on the frequency axis (S201).

Through the processing performed by the echo suppression unit 121, the suppressing unit 12 of the sound processor 1 executes an echo suppressing process (S202), calculates echo suppression gain g1(ω) on the basis of the result of the echo suppressing process (S203), and passes the calculated echo suppression gain g1(ω) to the noise suppression unit 122 and the integrating process unit 123.

Through the processing performed by the noise suppression unit 122, the suppressing unit 12 of the sound processor 1 executes a noise suppressing process on the basis of a first observation sound signal X1(ω) and a second observation sound signal X2(ω) (S204) so as to generate a fourth observation sound signal X4(ω) with ambient noise suppressed.

Furthermore, through the processing performed by the noise suppression unit 122, the suppressing unit 12 of the sound processor 1 derives power N(n, ω) of background noise on the basis of the first observation sound signal X1(ω) (S205) and further calculates power N_r(n, ω) of the background noise with echo suppressed, that is, a product of the echo suppression gain g1(ω) and the power N(n, ω) of the background noise (S206).

Then, through the processing performed by the noise suppression unit 122, the suppressing unit 12 of the sound processor 1 executes a correcting process for generating a corrected fourth observation sound signal X4_r(ω) by correcting the fourth observation sound signal X4(ω) on the basis of the power N_r(n, ω) of the background noise with the echo suppressed (S207), and passes the corrected fourth observation sound signal X4_r(ω) to the integrating process unit 123.

Through the processing performed by the integrating process unit 123, the suppressing unit 12 of the sound processor 1 executes an integrating suppressing process for generating a fifth observation sound signal X5(ω) by multiplying the corrected fourth observation sound signal X4_r(ω) by the echo suppression gain g1(ω) (S208) and outputs the generated fifth observation sound signal X5(ω) to the processing unit 17 as an output sound signal Xop(ω). The fifth observation sound signal X5(ω) generated in S208 is a sound signal obtained by subjecting the first observation sound signal X1(ω) to the echo suppressing process and the noise suppressing process.

Thereafter, the processing unit 17 of the sound processor 1 executes the acoustic processing such as voice recognition on the basis of the output sound signal Xop(ω), the IFFT process for converting the output sound signal Xop(ω) into a sound signal on the time axis, or various signal processing such as processing for outputting and transmitting the output sound signal as sound (S209).

Incidentally, although the respective processings are described to be performed one after another for convenience, the processing performed by the echo suppression unit 121 and the noise suppression unit 122 are performed substantially in parallel to each other.

In this manner, background noise may be effectively suppressed with influence of echo excluded by multiplying the power N(n, ω) of the background noise by the echo suppression gain g1(ω). Such processing is particularly effective when large power is continuously caused by audio sound at a specific frequency so as to increase background noise.

Although the background noise estimation unit and the correction unit are incorporated into the noise suppression unit in Embodiment 2, the invention is not limited to this but may be expanded to various form in which, for example, the background noise estimation unit and the correction unit are provided out of the noise suppression unit.

Embodiment 3

In Embodiment 3, the echo suppression gain calculated by the echo suppression unit in Embodiment 1 is used also in the noise suppression unit, and output sound suppression gain obtained by suppressing sound arriving from a direction of the sound outputting unit is calculated by the noise suppression unit so as to use the calculated output sound suppression gain by the echo suppression unit. In the following description, like reference numerals are used to refer to like elements used in Embodiment 1 or 2 so as to omit the detailed description. The exemplary structure of a sound processor 1 of Embodiment 3 is similar to that of Embodiment 1 described with reference to FIG. 5 and hence, the description is omitted by referring to Embodiment 1.

Figure 15:
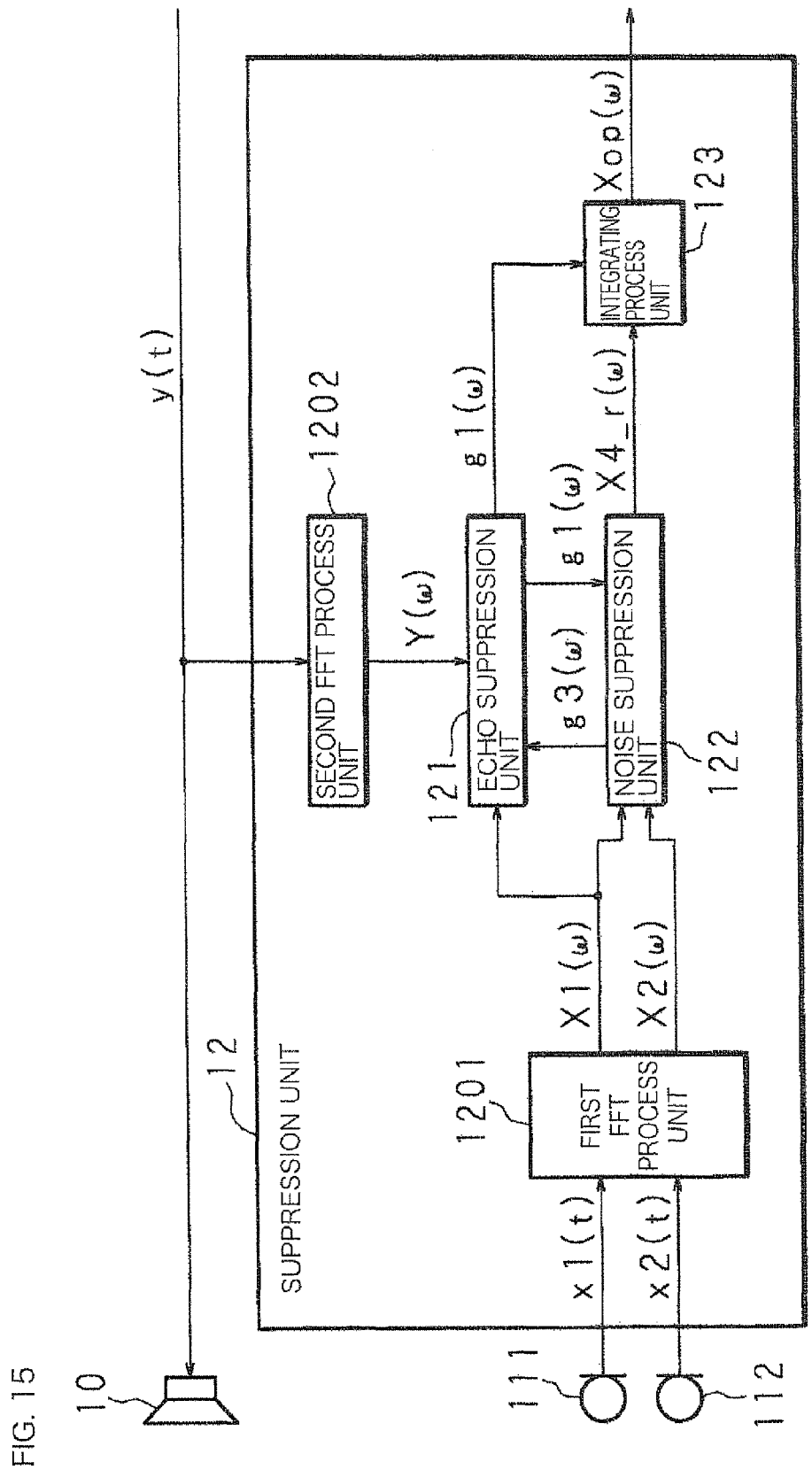
FIG. 15 is a functional block diagram illustrating an exemplary functional structure of units such as a suppressing unit included in a sound processor according to Embodiment 3 of the invention.

FIG. 15 is a functional block diagram illustrating an exemplary structure of units such as a suppressing unit 12 included in the sound processor 1 of Embodiment 3 of the invention. The suppressing unit 12 generates, through execution of a sound processing program 100, various program modules such as a first FFT process unit 1201 and a second FFT process unit 1202, an echo suppression unit 121, a noise suppression unit 122, and an integrating process unit 123. It is noted that the function of the background noise estimation unit for estimating background noise and the function of the correction unit for correcting a sound signal on the basis of the estimated background noise are incorporated into both the echo suppression unit 121 and the noise suppression unit 122 in Embodiment 3.

The echo suppression unit 121 accepts a first observation sound signal X1($\omega$), a reference sound signal Y($\omega$) and output sound suppression gain g3($\omega$) described later, and calculates echo suppression gain g1($\omega$), that is, a ratio of each frequency component between observation sound signals obtained before and after echo suppression. The echo suppression unit 121 passes the calculated echo suppression gain g1($\omega$) to the noise suppression unit 122 and the integrating process unit 123.

The noise suppression unit 122 executes a noise suppressing process on the basis of the first observation sound signal X1($\omega$) and a second observation sound signal X2($\omega$), so as to generate a fourth observation sound signal X4($\omega$) with ambient noise suppressed. Also, the noise suppression unit 122 estimates background noise in consideration of the echo suppression gain g1($\omega$) accepted from the echo suppression unit 121, corrects the fourth observation sound signal X4($\omega$) on the basis of the estimated background noise and passes a corrected fourth observation sound signal X4_r($\omega$) to the integrating process unit 123. Furthermore, the noise suppression unit 122 suppresses sound arriving from a direction of a sound outputting unit 10, and calculates output sound suppression gain g3($\omega$), that is, a ratio of each frequency component between observation sound signals obtained before and after the suppression. The noise suppression unit 122 passes the calculated output sound suppression gain g3($\omega$) to the echo suppression unit 121.

Figure 16:
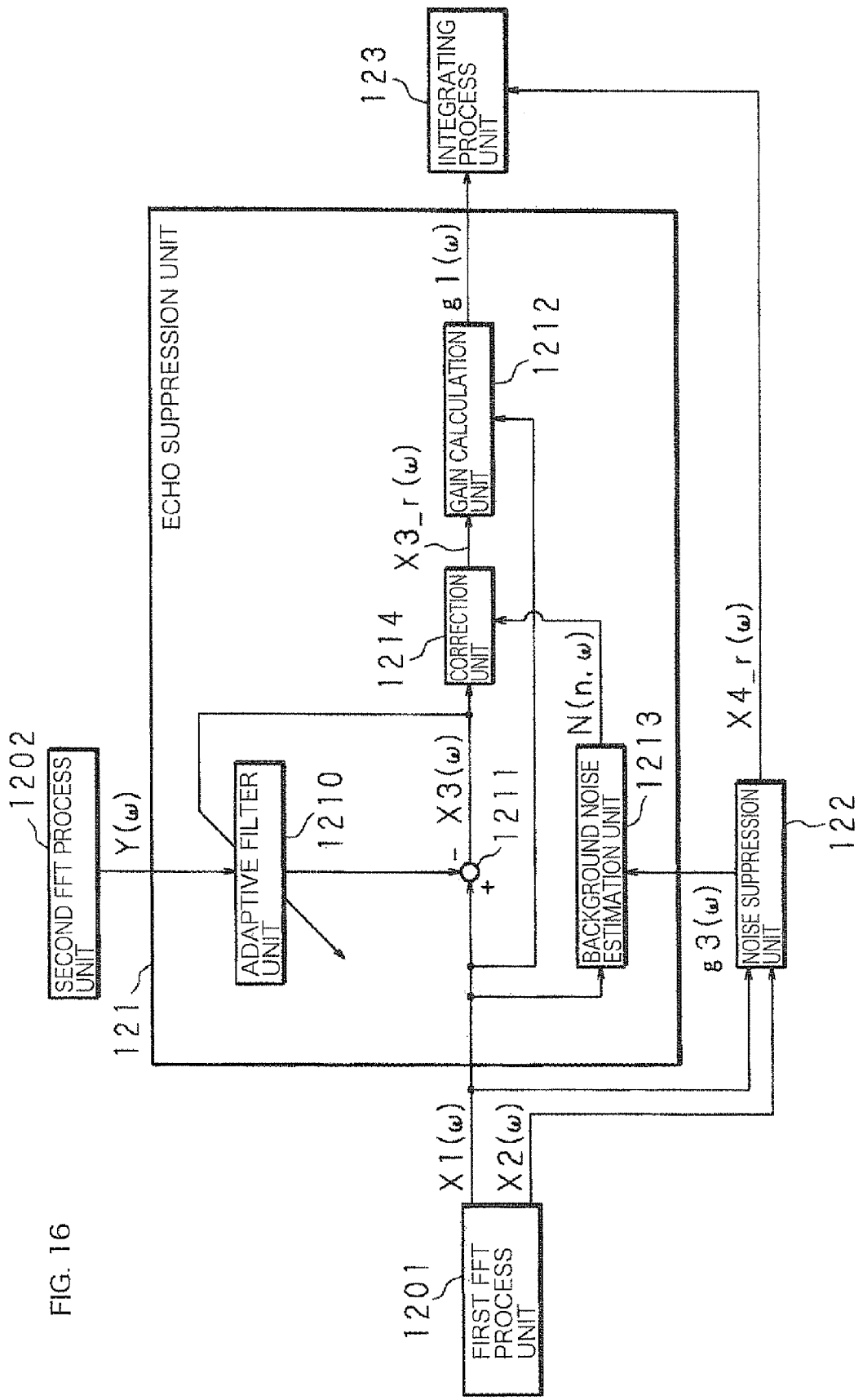
FIG. 16 is a functional block diagram illustrating an exemplary functional structure of an echo suppression unit and the like included in the sound processor of Embodiment 3 of the invention.

The echo suppression unit 121 functioning in the suppressing unit 12 will be described in more detail. FIG. 16 is a functional block diagram illustrating an exemplary functional structure of the echo suppression unit 121 and the like included in the sound processor 1 of Embodiment 3 of the invention. The echo suppression unit 121 includes various program modules such as an adaptive filter unit 1210, a removal unit 1211, a gain calculation unit 1212, a background noise estimation unit 1213 and a correction unit 1214.

The echo suppression unit 121 accepts the first observation sound signal X1($\omega$) from the first FFT process unit 1201 and accepts a reference sound signal Y($\omega$) from the second FFT process unit 1202. Furthermore, the echo suppression unit 121 accepts the output sound suppression gain g3($\omega$) from the noise suppression unit 122.

The background noise estimation unit 1213 accepts the first observation sound signal X1($\omega$) from the first FFT process unit 1201 and accepts the output sound suppression gain g3($\omega$) from the noise suppression unit 122. Then, the background noise estimation unit 1213 derives power N(n, $\omega$) of background noise by smoothing, with respect to each frequency component, time change of power P($\omega$) of a spectrum obtained as a square of the absolute value of the first observation sound signal X1($\omega$) in accordance with the expression (3) described in Embodiment 1. Furthermore, the background noise estimation unit 1213 compares the value of the output sound suppression gain g3($\omega$) at each frequency with a first threshold value precedently set so as to determine which is larger. With respect to a frequency f1 at which the output sound suppression gain g3($\omega$) is not more than the first threshold value, the background noise estimation unit 1213 employs newly calculated power N(n, f1) of the background noise, and with respect to a frequency f2 at which the output sound suppression gain g3($\omega$) is larger than the first threshold value, it employs precedently calculated power N(n-1, f2) of the background noise as a current power N(n, f2) of the background noise. In this manner, the background noise estimation unit 1213 derives the power N(n, $\omega$) of the background noise and corrects the derived power N(n, $\omega$) of the background noise on the basis of the output sound suppression gain g3($\omega$). Accordingly, at a frequency where the output sound suppression gain g3($\omega$) is larger than the first threshold value, it is estimated that influence of noise arriving from the direction of the sound outputting unit 10 apart from sound corresponding to a base of echo is large, so as to stop updating the power N(n, $\omega$) of the background noise. Then, the background noise estimation unit 1213 passes the power N(n, $\omega$) of the background noise corrected on the basis of the output sound suppression gain g3($\omega$) to the correction unit 1214.

The correction unit 1214 accepts the third observation sound signal X3($\omega$) from the removal unit 1211 and accepts the power N(n, $\omega$) of the background noise from the background noise estimation unit 1213. Then, the correction unit 1214 generates a corrected third observation sound signal X3_r($\omega$) by correcting the third observation sound signal X3($\omega$) on the basis of the power N(n, $\omega$) of the background noise, and passes the corrected third observation sound signal X3_r($\omega$) thus generated to the gain calculation unit 1212. The correction performed by the correction unit 1214 is carried out by converting the value of the third observation sound signal X3($\omega$) while retaining the phase of the third observation sound signal X3($\omega$) so that a square root of the power N(n, $\omega$) of the background noise may accord with the absolute value of the third observation sound signal X3($\omega$) at a frequency $\omega$ where power P3($\omega$) of a spectrum obtained as a square of the absolute value of the third observation sound signal X3($\omega$) is smaller than the power N(n, $\omega$) of the background noise. Through the correction of the correction unit 1214, the background noise is prevented from being excessively suppressed, and the level of the third observation sound signal X3($\omega$) may be lowered to the level of the background noise in a single-talk state where a speaking person is not speaking.

The gain calculation unit 1212 accepts the first observation sound signal X1($\omega$) from the first FFT process unit 1201 and accepts the corrected third observation sound signal X3_r($\omega$) from the correction unit 1214. Then, the gain calculation unit 1212 calculates echo suppression gain g1($\omega$), that is, a ratio in absolute values of each frequency component of the corrected third observation sound signal X3_r($\omega$) to the first observation sound signal X1($\omega$). It is noted that the gain calculation unit 1212 of Embodiment 3 uses the corrected third observation sound signal X3_r($\omega$) instead of the third observation sound signal X3($\omega$) in the calculation in accordance with the expression (1).

Then, the echo suppression unit 121 passes the echo suppression gain g1($\omega$) calculated by the gain calculation unit 1212 to the noise suppression unit 122 and the integrating process unit 123.

Figure 17:
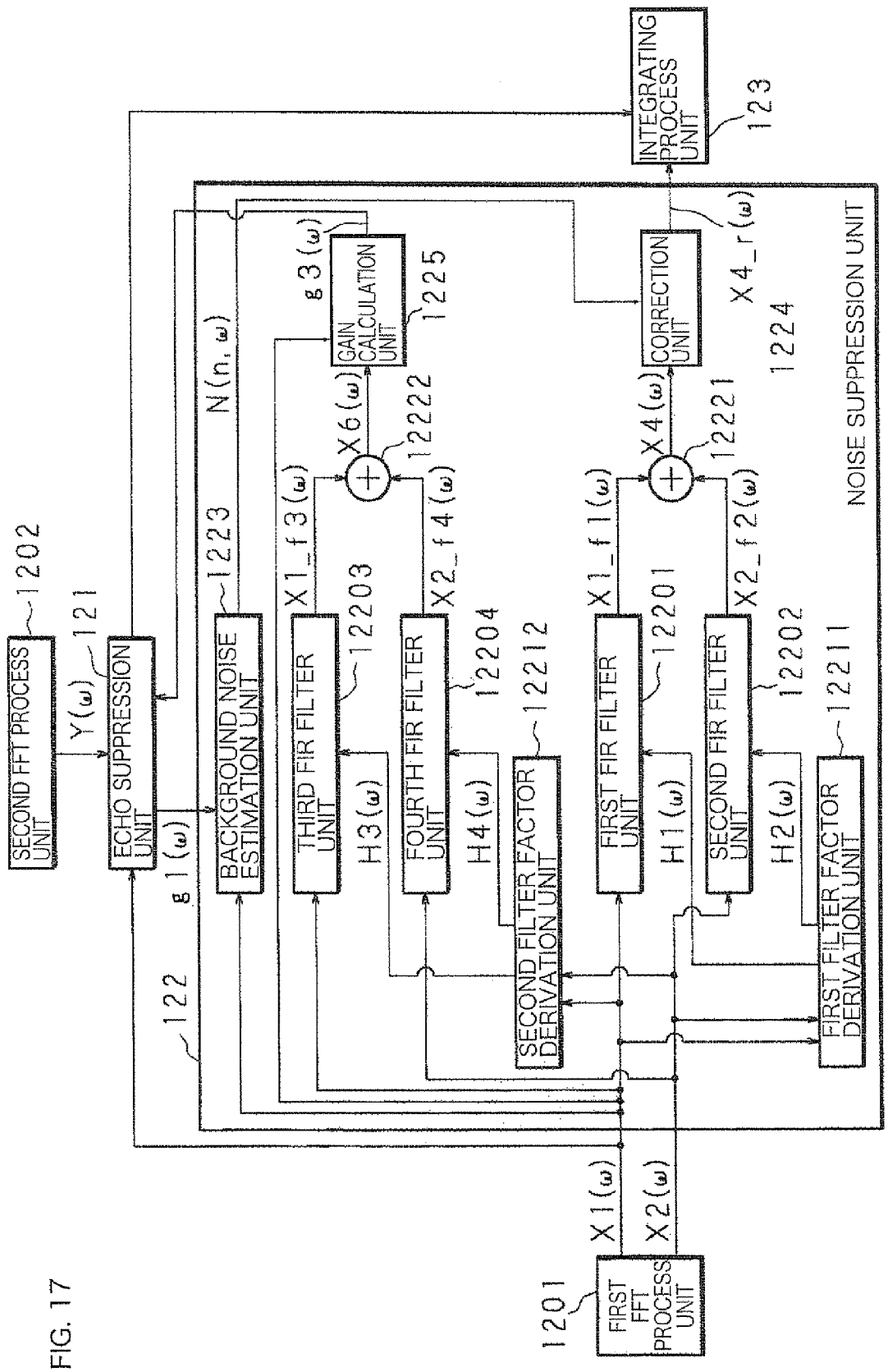
FIG. 17 is a functional block diagram illustrating an exemplary functional structure of a noise suppression unit and the like included in the sound processor of Embodiment 3 of the invention.

The noise suppression unit 122 functioning in the suppressing unit 12 will be described in more detail. FIG. 17 is a functional block diagram illustrating an exemplary functional structure of the noise suppressing unit 122 and the like included in the sound processor 1 of Embodiment 3 of the invention. The noise suppression unit 122 includes various program modules such as a first FIR filter unit 12201 and a second FIR filter unit 12202, a first filter factor derivation unit 12211, a first suppression unit 12221, a background noise estimation unit 1223, a correction unit 1224, a third FIR filter unit 12203 and a fourth FIR filter unit 12204, a second filter factor derivation unit 12212, a second suppression unit 12222, and a gain calculation unit 1225. It is noted that the first filter factor derivation unit 12211 and the first suppression unit 12221 execute similar processing to the filter factor derivation unit 1221 and the suppression unit 1222 described in Embodiment 1. Also, in FIG. 17, a first observation sound signal obtained after filtering by the first FIR filter unit 12201 is expressed as X1_f1(ω), and a second observation sound signal obtained after filtering by the second FIR filter unit 12202 is expressed as X2_f2(ω).

The noise suppression unit 122 accepts the first observation sound signal X1(ω) and the second observation sound signal X2(ω) from the first FFT process unit 1201 and accepts the echo suppression gain g1(ω) from the echo suppression unit 121.

The background noise estimation unit 1223 derives power N(n, ω) of background noise by smoothing, with respect to each frequency component, time change of power P(ω) of a spectrum obtained as a square of the absolute value of the first observation sound signal X1(ω) in accordance with the expression (3) described in Embodiment 1. Also, the background noise estimation unit 1223 compares the value of the echo suppression gain g1(ω) at each frequency with a second threshold value precedently set so as to determine which is larger. With respect to a frequency f3 at which the echo suppression gain g1(ω) is not less than the second threshold value, the background noise estimation unit 1223 employs newly calculated power N(n, f3) of the background noise, and with respect to a frequency f4 at which the echo suppression gain g1(ω) is smaller than the second threshold value, it employs precedently calculated power N(n−1, f4) of the background noise as current power N(n, f4) of the background noise. In this manner, the background noise estimation unit 1223 derives the power N(n, ω) of the background noise and corrects the derived power N(n, ω) of the background noise on the basis of the echo suppression gain g1(ω). Accordingly, it is possible to estimate the background noise with the influence of echo suppressed. Then, the background noise estimation unit 1223 passes the power N(n, ω) of the background noise corrected on the basis of the echo suppression gain g1(ω) to the correction unit 1224.

The correction unit 1224 generates a corrected fourth observation sound signal X4_r(ω) by correcting the fourth observation sound signal X4(ω) accepted from the first suppression unit 12221 on the basis of the power N(n, ω) of the background noise.

The third FIR filter unit 12203 filters the first observation sound signal X1(ω) on the basis of a third filter factor H3(ω) set therein and passes the filtered first observation sound signal X1_f3(ω) to the second suppression unit 12222.

The fourth FIR filter unit 12204 filters the second observation sound signal X2(ω) on the basis of a fourth filter factor H4(ω) set therein and passes the filtered second observation sound signal X2_f4(ω) to the second suppression unit 12222.

The second filter factor derivation unit 12212 derives the third filter factor H3(ω) and the fourth filter factor H4(ω) respectively on the basis of the first observation sound signal X1(ω) and the second observation sound signal X2(ω), passes the derived third filter factor H3(ω) to the third FIR filter unit 12203, and passes the fourth filter factor H4(ω) to the fourth FIR filter unit 12204. The third FIR filter unit 12203 and the fourth FIR filter unit 12204 respectively set the third filter factor H3(ω) and the fourth filter factor H4(ω) thus accepted.

The second suppression unit 12222 generates a spectrum X6(ω) of a sixth observation sound signal in which sound arriving from directions other than the direction of the sound outputting unit 10 is suppressed (hereinafter referred to as the sixth observation sound signal X6(ω) by summing up the first observation sound signal X1_f3(ω) and the filtered second observation sound signal X2_f4(ω). Then, the second suppression unit 12222 passes the generated sixth observation sound signal X6(ω) to the gain calculation unit 1225.

The gain calculation unit 1225 accepts the first observation sound signal X1(ω) from the first FFT process unit 1201 and accepts the sixth observation sound signal X6(ω) from the second suppression unit 12222. Then, the gain calculation unit 1225 calculates output sound suppression gain g3(ω), that is, a ratio in absolute values of each frequency component of the sixth observation sound signal X6(ω) to the first observation sound signal X1(ω) in accordance with an expression (9) described below for calculating a spectral ratio between the first observation sound signal X1(ω) and the sixth observation sound signal X6(ω).

$$g3(\omega)=|X6(\omega)|/|X1(\omega)| \qquad \text{Expression (9)}$$

wherein g3(ω) indicates output sound suppression gain; X6(ω) indicates a spectrum of the sixth observation sound signal; and X1(ω) indicates a spectrum of the first observation sound signal.

Then, the noise suppression unit 122 passes the output sound suppression gain g3(ω) calculated by the gain calculation unit 1225 to the echo suppression unit 121 and passes the corrected fourth observation sound signal X4_r(ω) calculated by the correction unit 1224 to the integrating process unit 123.

Figure 18:
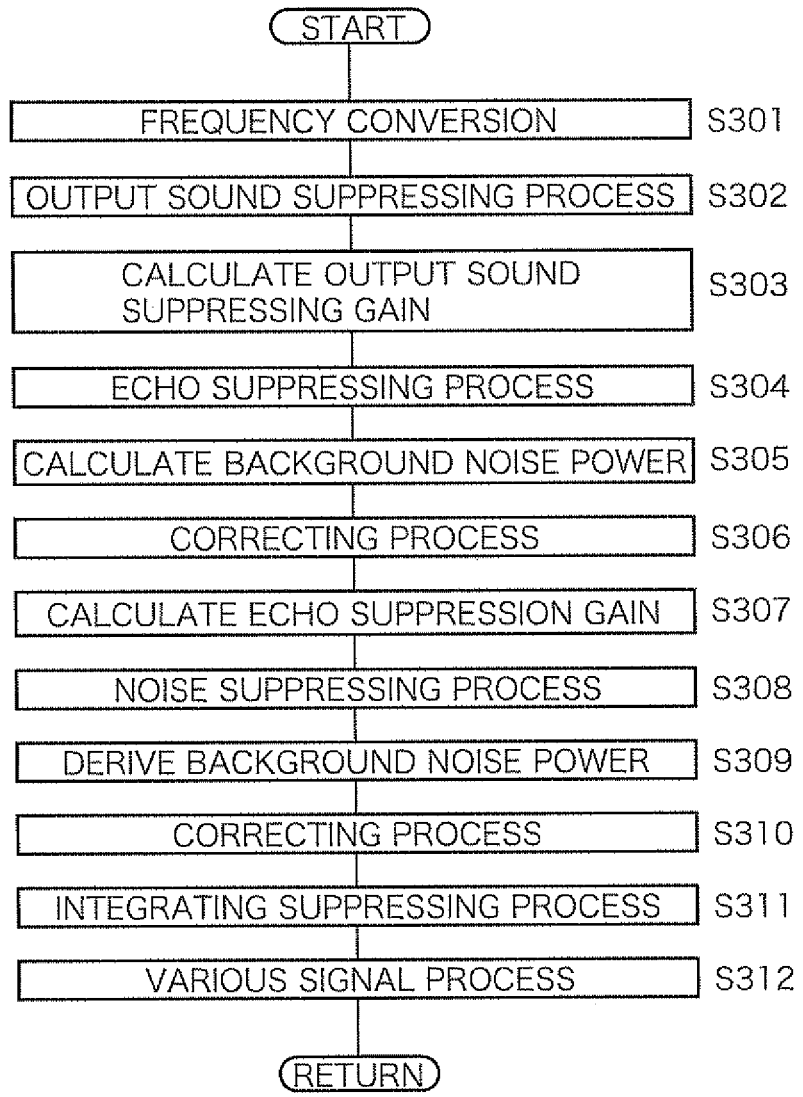
FIG. 18 is a flowchart illustrating an example of processing performed by the sound processor of Embodiment 3 of the invention.

Next, the processing performed by the sound processor 1 of Embodiment 3 of the invention will be described. FIG. 18 is a flowchart illustrating an example of the processing performed by the sound processor 1 of Embodiment 3 of the invention. Through the processing performed by the first FFT process unit 1201 and the second FFT process unit 1202, the suppressing unit 12 of the sound processor 1 frames accepted sound signals and converts the framed sound signals respectively into components on the frequency axis (S301).

Through the processing performed by the noise suppression unit 122, the suppressing unit 12 of the sound processor 1 executes an output sound suppressing process for suppressing sound arriving from directions other than the direction of the sound outputting unit 10 on the basis of a first observation sound signal X1(ω) and a second observation sound signal X2(ω) (S302) so as to generate a sixth observation sound signal X6(ω), calculates output sound suppression gain g3(ω), that is, a ratio between the observation sound signals obtained before and after the suppression on the basis of the first observation sound signal X1(ω) and the sixth observation sound signal X6(ω) (S303), and passes the calculated output sound suppression gain g3(ω) to the echo suppression unit 121.

Through the processing performed by the echo suppression unit 121, the suppressing unit 12 of the sound processor 1 accepts the first observation sound signal X1(ω), a reference sound signal Y(ω) and the output sound suppression gain g3(ω), and executes an echo suppressing process on the basis of the first observation sound signal X1(ω) and the reference sound signal Y(ω) (S304), so as to generate a third observation sound signal X3(ω) by removing echo from the first observation sound signal X1(ω).

Through the processing performed by the echo suppression unit 121, the suppressing unit 12 of the sound processor 1 derives power N(n, ω) of background noise on the basis of the first observation sound signal X1(ω) and the output sound suppression gain g3(ω) (S305). In S305, the power N(n, ω) of the background noise updated with respect to a frequency component at which the output sound suppression gain $g3(\omega)$ corresponding to a ratio between sounds output from the sound outputting unit 10 before and after the suppression is not more than the first threshold value is derived.

Through the processing performed by the echo suppression unit 121, the suppressing unit 12 of the sound processor 1 executes a correcting process for correcting the third observation sound signal $X3(\omega)$ on the basis of the power $N(n, \omega)$ of the background noise (S306) so as to generate a corrected third observation sound signal $X3\_r(\omega)$. The corrected third observation sound signal $X3\_r(\omega)$ generated through the correcting process performed in S306 is a signal in which echo estimated in consideration of the background noise is suppressed.

Through the processing performed by the echo suppression unit 121, the suppressing unit 12 of the sound processor 1 calculates echo suppression gain $g1(\omega)$ on the basis of the first observation sound signal $X1(\omega)$ and the corrected third observation sound signal $X3\_r(\omega)$ (S307), and passes the calculated echo suppression gain $g1(\omega)$ to the noise suppression unit 122 and the integrating process unit 123.

Through the processing performed by the noise suppression unit 122, the suppressing unit 12 of the sound processor 1 executes a noise suppressing process on the basis of the first observation sound signal $X1(\omega)$ and the second observation sound signal $X2(\omega)$ (S308), so as to generate a fourth observation sound signal $X4(\omega)$ with ambient noise suppressed.

Furthermore, through the processing performed by the noise suppression unit 122, the suppressing unit 12 of the sound processor 1 derives power $N(n, \omega)$ of the background noise on the basis of the first observation sound signal $X1(\omega)$ and the echo suppression gain $g1(\omega)$ (S309). In S309, the power $N(n, \omega)$ of the background noise updated with respect to a frequency component at which the echo suppression gain $g1(\omega)$ corresponding to a ratio between signals obtained before and after the echo suppression is not less than the second threshold value is derived.

Through the processing performed by the noise suppression unit 122, the suppressing unit 12 of the sound processor 1 executes a correcting process for generating a corrected fourth observation sound signal $X4\_r(\omega)$ by correcting the fourth observation sound signal $X4(\omega)$ on the basis of the power $N(n, \omega)$ of the background noise (S310), and passes the corrected fourth observation signal $X4\_r(\omega)$ to the integrating process unit 123.

Through the processing performed by the integrating process unit 123, the suppressing unit 12 of the sound processor 1 executes an integrating suppressing process for generating a fifth observation sound signal $X5(\omega)$ by multiplying the corrected fourth observation sound signal $X4\_r(\omega)$ by the echo suppression gain $g1(\omega)$ (S311), and outputs the generated fifth observation sound signal $X5(\omega)$ to the processing unit 17 as an output sound signal $Xop(\omega)$. The fifth observation sound signal $X5(\omega)$ generated in S311 is a sound signal obtained by subjecting the first observation sound signal $X1(\omega)$ to the echo suppressing process and the noise suppressing process.

Thereafter, the processing unit 17 of the sound processor 1 executes the acoustic processing such as voice recognition on the basis of the output sound signal $Xop(\omega)$, the IFFT process for converting the output sound signal $Xop(\omega)$ into a sound signal on the time axis, or various signal processing such as processing for outputting and transmitting the output sound signal as sound (S312).

Although the respective processings are described to be performed one after another for convenience, the processing of the echo suppression unit 121 and the noise suppression unit 122 is performed substantially in parallel to each other. Furthermore, the echo suppression unit 121 executes processing on a current frame on the basis of the output sound suppression gain $g3(\omega)$ calculated by the noise suppression unit 122 on the basis of a frame immediately before, and the noise suppression unit 122 executes processing on a current frame on the basis of the echo suppression gain $g1(\omega)$ calculated by the echo suppression unit 121 on the basis of a frame immediately before, whereas these timings may be appropriately set.

Although the results of the processing of the echo suppression unit and the noise suppression unit are mutually used in Embodiment 3, the invention may be expanded to various form such as one where the result of the processing of one unit alone is used in the other unit.

Embodiment 4

In Embodiment 4, the noise suppression unit of Embodiment 1 generates a sound signal in which voice of a speaking person is enhanced and passes it to the echo suppression unit, the echo suppression unit determines, on the basis of the sound signal in which the voice of the speaking person is enhanced, whether it is a single-talk state or a double-talk state, and echo is suppressed on the basis of the result of the determination. In the following description, like reference numerals are used to refer to like elements used in any of Embodiments 1 through 3 so as to omit the detailed description. The exemplary structure of a sound processor 1 according to Embodiment 4 is similar to that described in Embodiment 1 with reference to FIG. 5 and hence the description is omitted by referring to Embodiment 1.

Figure 19:
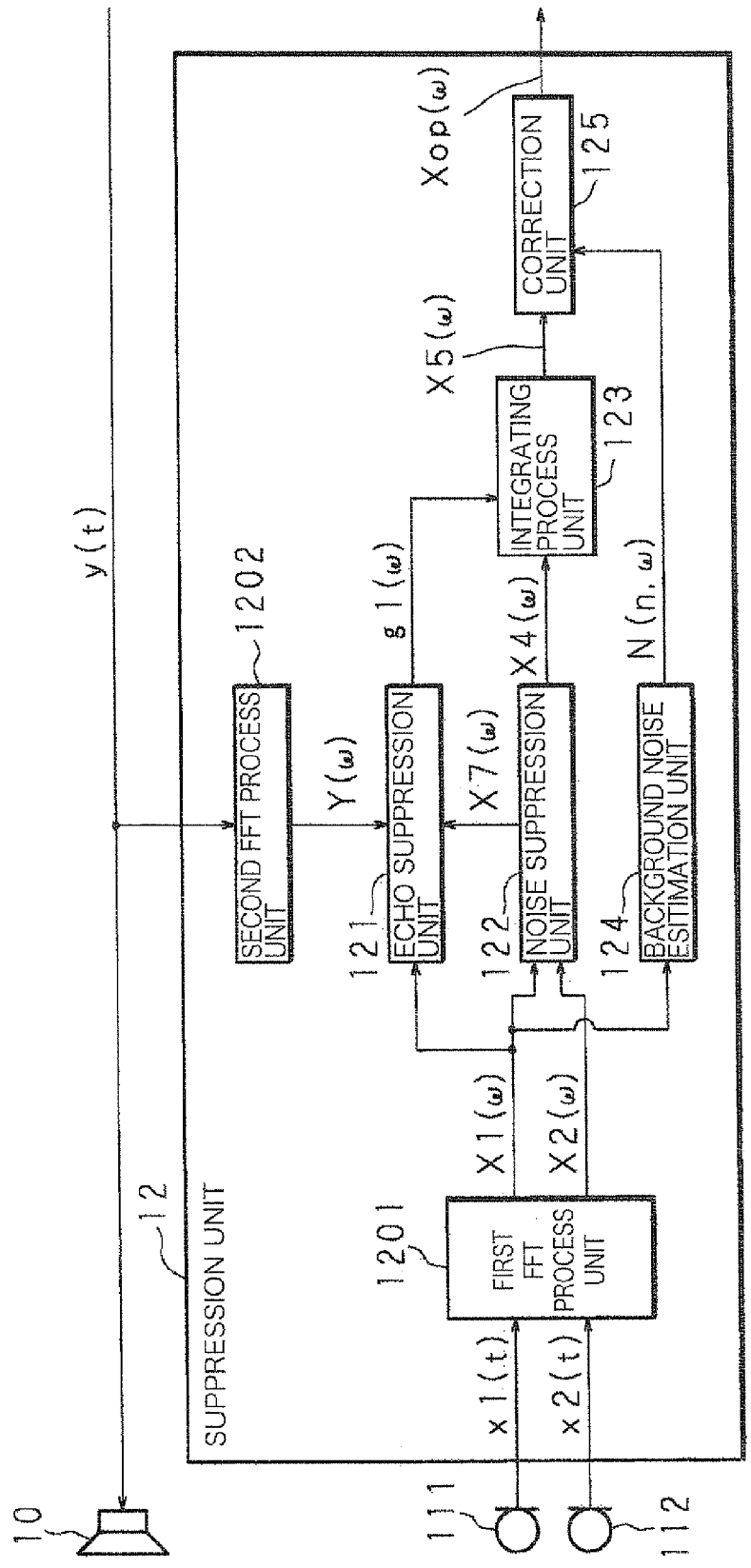
FIG. 19 is a functional block diagram illustrating an exemplary functional structure of units such as a suppressing unit included in a sound processor according to Embodiment 4 of the invention.

FIG. 19 is a functional block diagram illustrating an exemplary functional structure of units such as a suppressing unit 12 included in the sound processor 1 of Embodiment 4 of the invention. The suppressing unit 12 generates, through execution of a sound processing program 100, various program modules such as a first FFT process unit 1201 and a second FFT process unit 1202, an echo suppression unit 121, a noise suppression unit 122, an integrating process unit 123, a background noise estimation unit 124 and a correction unit 125.

The echo suppression unit 121 accepts a first observation sound signal $X1(\omega)$, a reference sound signal $Y(\omega)$ and a spectrum $X7(\omega)$ of a seventh observation sound signal described later (hereinafter referred to as the seventh observation sound signal $X7(\omega)$) and calculates echo suppression gain $g1(\omega)$, that is, a ratio of each frequency component between observation sound signals obtained before and after echo suppression. Then, the echo suppression unit 121 passes the calculated echo suppression gain $g1(\omega)$ to the integrating process unit 123.

The noise suppression unit 122 executes a noise suppressing process on the basis of the first observation sound signal $X1(\omega)$ and a second observation sound signal $X2(\omega)$, so as to generate a fourth observation sound signal $X4(\omega)$ with ambient noise suppressed. Then, the noise suppression unit 122 passes the generated fourth observation sound signal $X4(\omega)$ to the integrating process unit 123. Furthermore, the noise suppression unit 122 generates the seventh observation sound signal $X7(\omega)$ by executing a voice enhancing process for enhancing voice arriving from a direction of a speaking person on the basis of the first observation sound signal $X1(\omega)$ and the second observation sound signal $X2(\omega)$. Then, the noise suppression unit 122 passes the generated seventh observation sound signal $X7(\omega)$ to the echo suppression unit 121.

Figure 20:
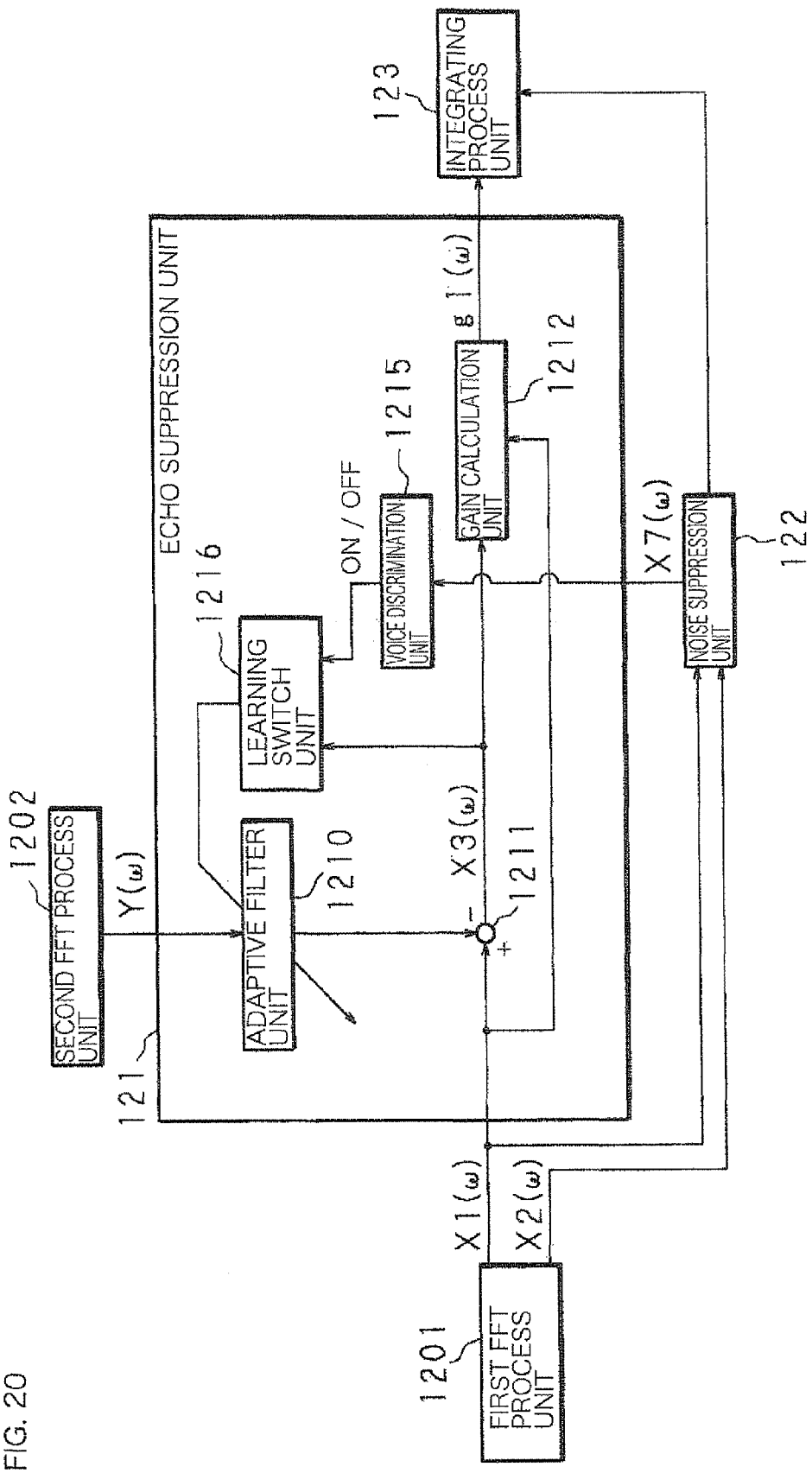
FIG. 20 is a functional block diagram illustrating an exemplary functional structure of an echo suppression unit and the like included in the sound processor of Embodiment 4 of the invention.

The echo suppression unit 121 functioning in the suppressing unit 12 will be described in more detail. FIG. 20 is a functional block diagram illustrating an exemplary functional structure of the echo suppression unit 121 and the like included in the sound processor 1 of Embodiment 4 of the invention. The echo suppression unit 121 includes various program modules such as an adaptive filter unit 1210, a removal unit 1211, a gain calculation unit 1212, a voice discrimination unit 1215, a learning switch unit 1216.

The echo suppression unit 121 accepts the first observation sound signal $X1(\omega)$ from the first FFT process unit 1201 and accepts the reference sound signal $Y(\omega)$ from the second FFT process unit 1202. Also, the echo suppression unit 121 accepts the seventh observation sound signal $X7(\omega)$ from the noise suppression unit 122.

The voice discrimination unit 1215 determines, on the basis of the seventh observation sound signal $X7(\omega)$ accepted from the noise suppression unit 122, whether it is a single-talk state where a speaking person is not talking or a double-talk state where the speaking person is talking. Since the seventh observation sound signal $X7(\omega)$ is a sound signal in which sound arriving from the direction of the speaking person is regarded as voice and hence enhanced, it is possible to determine with a high degree of accuracy whether it is a single-talk state or a double-talk state. Then, the voice discrimination unit 1215 passes a discrimination result signal corresponding to the result of the determination to the learning switch unit 1216. When it is determined that it is, for example, a single-talk state, a signal corresponding to "ON" for making the adaptive filter unit 1210 execute learning is passed as the discrimination result signal, and when it is determined that it is a double-talk state, a signal corresponding to "OFF" for halting the learning of the adaptive filter unit 1210 is passed as the discrimination result signal.

The learning switch unit 1216 accepts a third observation sound signal $X3(\omega)$ from the removal unit 1211 and accepts the discrimination result signal from the voice discrimination unit 1215. When the discrimination result signal is "ON" corresponding to a single-talk state, the learning switch unit 1216 passes the third observation sound signal $X3(\omega)$ and a learning execution signal for causing calculation and update of a filter factor through the learning on the basis of the third observation sound signal $X3(\omega)$ to the adaptive filter unit 1210. When the discrimination result signal is "OFF" corresponding to a double-talk state, the learning switch unit 1216 passes a learning halting signal for halting the update of the filter factor to the adaptive filter unit 1210.

The echo suppression unit 121 of Embodiment 4 executes processing for generating the third observation sound signal $X3(\omega)$ by suppressing an echo component in the first observation sound signal $X1(\omega)$ on the basis of highly accurate discrimination result of single-talk or double-talk. Then, the echo suppression unit 121 calculates echo suppression gain $g1(\omega)$, that is, a ratio in absolute values of each frequency component of the third observation sound signal $X3(\omega)$ to the first observation sound signal $X1(\omega)$, and passes the calculated echo suppression gain $g1(\omega)$ to the integrating process unit 123.

Figure 21:
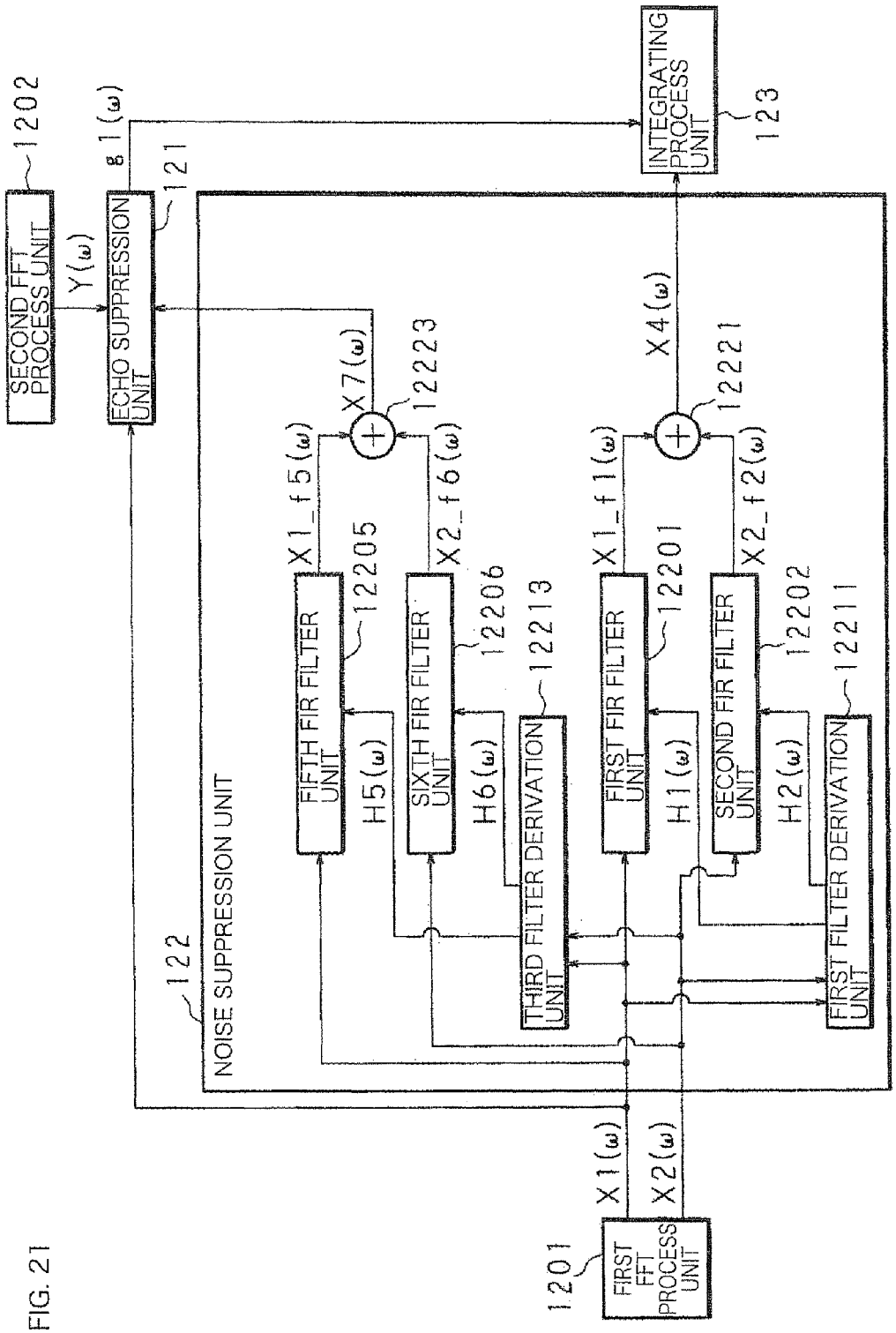
FIG. 21 is a functional block diagram illustrating an exemplary functional structure of a noise suppression unit and the like included in the sound processor of Embodiment 4 of the invention.

The noise suppression unit 122 functioning in the suppressing unit 12 will be described in more detail. FIG. 21 is a functional block diagram illustrating an exemplary functional structure of the noise suppression unit 122 and the like included in the sound processor 1 of Embodiment 4 of the invention. The noise suppression unit 122 includes various program modules such as a first FIR filter unit 12201 and a second FIR filter unit 12202, a first filter factor derivation unit 12211, a first suppression unit 12221, a fifth FIR filter unit 12205 and a sixth FIR filter unit 12206, a third filter factor derivation unit 12213 and a third suppression unit 12223.

The noise suppression unit 122 accepts the first observation sound signal $X1(\omega)$ and the second observation sound signal $X2(\omega)$ from the first FFT process unit 1201.

The fifth FIR filter unit 12205 filters the first observation sound signal $X1(\omega)$ on the basis of a fifth filter factor $H5(\omega)$ set therein, and passes a filtered first observation sound signal $X1\_f5(\omega)$ to the third suppression unit 12223.

The sixth FIR filter unit 12206 filters the second observation sound signal $X2(\omega)$ on the basis of a sixth filter factor $H6(\omega)$ set therein, and passes a filtered second observation sound signal $X2\_f6(\omega)$ to the third suppression unit 12223.

The third filter factor derivation unit 12213 derives the fifth filter factor $H5(\omega)$ and the sixth filter factor $H6(\omega)$ respectively on the basis of the first observation sound signal $X1(\omega)$ and the second observation sound signal $X2(\omega)$, passes the derived fifth filter factor $H5(\omega)$ to the fifth FIR filter unit 12205, and passes the sixth filter factor $H6(\omega)$ to the sixth FIR filter unit 12206. The fifth FIR filter unit 12205 and the sixth FIR filter unit 12206 respectively set the fifth filter factor $H5(\omega)$ and the sixth filter factor $H6(\omega)$ thus accepted.

The third suppression unit 12223 generates the seventh observation sound signal $X7(\omega)$ in which sound arriving from a direction of a speaking person is enhanced by summing up the filtered first observation sound signal $X1\_f5(\omega)$ and the filtered second observation sound signal $X2\_6(\omega)$. In Embodiment 4, the fifth FIR filter unit 12205, the sixth FIR filter unit 12206, the third filter factor derivation unit 12213 and the third suppression unit 12223 together function as a target sound enhancement unit for enhancing voice arriving from a direction of a speaking person, namely, target sound arriving from a target direction.

Thereafter, the noise suppression unit 122 passes the fourth observation sound signal $X4(\omega)$ with ambient noise suppressed to the integrating process unit 123, and passes the seventh observation sound signal $X7(\omega)$ with voice of the speaking person enhanced to the echo suppression unit 121. Incidentally, when the fourth observation sound signal $X4(\omega)$ is generated with the ambient noise suppressed and with a filter factor for enhancing the voice of the speaking person set, the fourth observation sound signal $X4(\omega)$ may be used as the seventh observation sound signal $X7(\omega)$, and the structure of the noise suppression unit 122 may be thus simplified.

Figure 22:
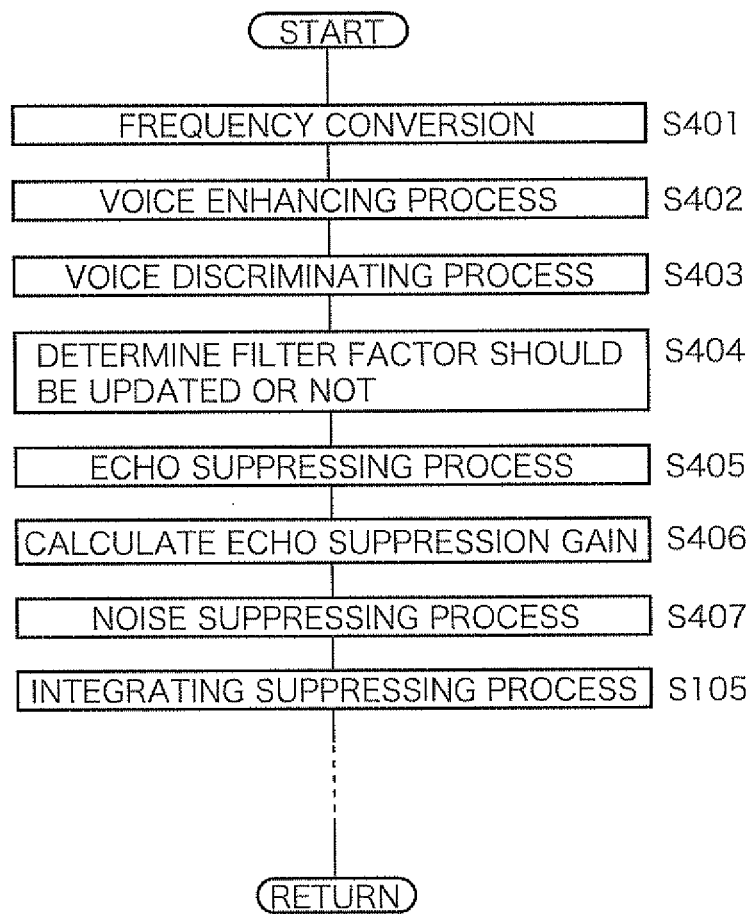
FIG. 22 is a flowchart illustrating an example of processing performed by the sound processor of Embodiment 4 of the invention.

Next, the processing performed by the sound processor 1 of Embodiment 4 of the invention will be described. FIG. 22 is a flowchart illustrating an example of the processing performed by the sound processor 1 of Embodiment 4 of the invention. Through the processing performed by the first FFT process unit 1201 and the second FFT process unit 1202, the suppressing unit 12 of the sound processor 1 frames accepted sound signals and converts the framed sound signals into spectra respectively corresponding to components on the frequency axis (S401).

Through the processing performed by the noise suppression unit 122, the suppressing unit 12 of the sound processor 1 executes a voice enhancing process for enhancing sound arriving from a direction of a speaking person regarded as voice on the basis of a first observation sound signal $X1(\omega)$ and a second observation sound signal $X2(\omega)$ (S402), so as to generate a seventh observation sound signal $X7(\omega)$, and passes the generated seventh observation sound signal $X7(\omega)$ to the echo suppression unit 121.

Through the processing performed by the echo suppression unit 121, the suppressing unit 12 of the sound processor 1 accepts the first observation sound signal $X1(\omega)$, a reference sound signal $Y(\omega)$ and the seventh observation sound signal X7(ω). Then, through the processing performed by the echo suppression unit 121, the suppressing unit 12 of the sound processor 1 executes a voice discriminating process for discriminating, on the basis of the seventh observation sound signal X7(ω), whether it is a single-talk state or a double-talk state (S403), and determines, on the basis of the result of the discrimination, whether or not a filter factor of the adaptive filter unit 1210 may be updated through learning based on the third observation sound signal X3(ω) (S404). In processings S403 and S404, through the processing performed by the voice discrimination unit 1215 and the learning switch unit 1216, it is discriminated and determined whether or not the filter factor of the adaptive filter unit 1210 may be updated.

Through the processing performed by the echo suppression unit 121, the suppressing unit 12 of the sound processor 1 executes an echo suppressing process on the basis of the first observation sound signal X1(ω), the reference sound signal Y(ω) and the result of the determination whether or not the filter factor may be updated (S405), so as to generate a third observation sound signal X3(ω) by removing echo from the first observation sound signal X1(ω).

Then, through the processing performed by the echo suppression unit 121, the suppressing unit 12 of the sound processor 1 calculates echo suppression gain g1(ω) on the basis of the first observation sound signal X1(ω) and the third observation sound signal X3(ω) (S406), and passes the calculated echo suppression gain g1(ω) to the integrating process unit 123.

Through the processing performed by the noise suppression unit 122, the suppressing unit 12 of the sound processor 1 executes a noise suppressing process on the basis of the first observation sound signal X1(ω) and the second observation sound signal X2(ω) (S407), and passes a fourth observation sound signal X4(ω) with ambient noise suppressed to the integrating process unit 123.

Thereafter, the sound processor 1 executes the processing of S105 and after illustrated in the flowchart of Embodiment 1. Although the respective processings are described to be performed one after another for convenience, the processing of the echo suppression unit 121 and the noise suppression unit 122 is performed substantially in parallel to each other. In this manner, in Embodiment 4, it is possible to decide with a high degree of accuracy, on the basis of a sound signal in which voice of a speaking person is enhanced, whether it is a single-talk state or a double-talk state.

Embodiment 5

In Embodiment 5, the noise suppression unit of Embodiment 1 generates a sound signal in which voice of a speaking person is suppressed and passes it to the echo suppression unit, and the echo suppression unit suppresses echo in consideration of the sound signal in which the voice of the speaking person is suppressed. In the following description, like reference numerals are used to refer to like elements used in any of Embodiments 1 through 4, so as to omit the detailed description. The exemplary structure of a sound processor 1 according to Embodiment 5 is similar to that of Embodiment 1 described with reference to FIG. 5, and hence the description is omitted by referring to Embodiment 1.

Figure 23:
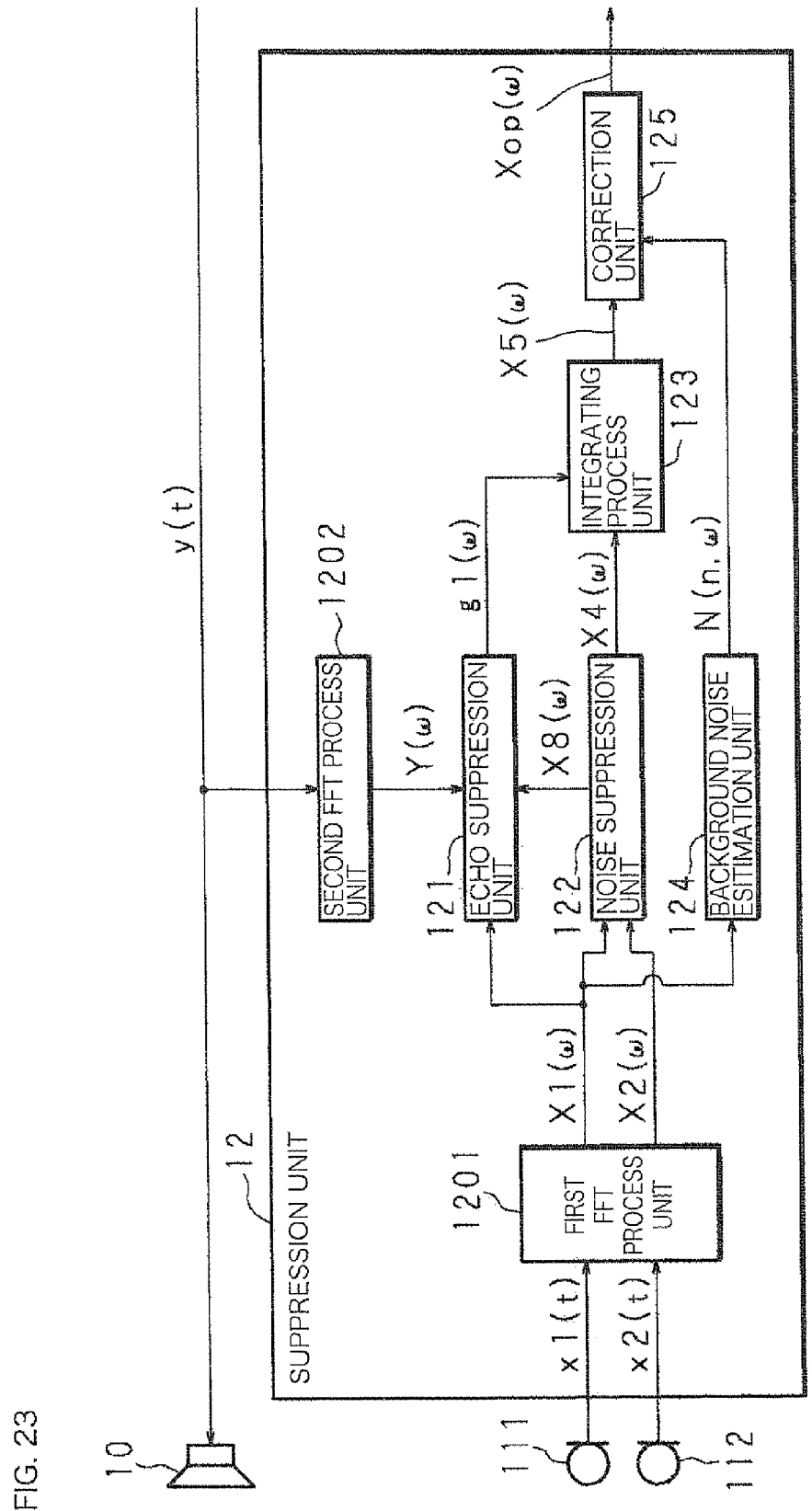
FIG. 23 is a functional block diagram illustrating an exemplary functional structure of units such as a suppressing unit included in a sound processor according to Embodiment 5 of the invention.

FIG. 23 is a functional block diagram illustrating an exemplary functional structure of units such as a suppressing unit 12 included in the sound processor 1 of Embodiment 5 of the invention. The suppressing unit 12 generates, through execution of a sound processing program 100, various program modules such as a first FFT process unit 1201 and a second FFT process unit 1202, an echo suppression unit 121, a noise suppression unit 122, an integrating process unit 123, a background noise estimation unit 124 and a correction unit 125.

The echo suppression unit 121 accepts a first observation sound signal X1(ω), a reference sound signal Y(ω) and a spectrum X8(ω) of an eighth observation sound signal described later (hereinafter referred to as the eighth observation sound signal X8(ω), and calculates echo suppression gain g1(ω), that is, a ratio of each frequency component between observation sound signals obtained before and after echo suppression. The echo suppression unit 121 passes the calculated echo suppression gain g1(ω) to the integrating process unit 123.

The noise suppression unit 122 executes a noise suppressing process on the basis of the first observation sound signal X1(ω) and a second observation sound signal X2(ω), so as to generate a fourth observation sound signal X4(ω) with ambient noise suppressed. Then, the noise suppression unit 122 passes the generated fourth observation sound signal X4(ω) to the integrating process unit 123. Furthermore, the noise suppression unit 122 generates the eighth observation sound signal X8(ω) by executing a voice suppressing process for suppressing voice arriving from a direction of a speaking person on the basis of the first observation sound signal X1(ω) and the second observation sound signal X2(ω). Then, the noise suppression unit 122 passes the generated eighth observation sound signal X8(ω) to the echo suppression unit 121.

Figure 24:
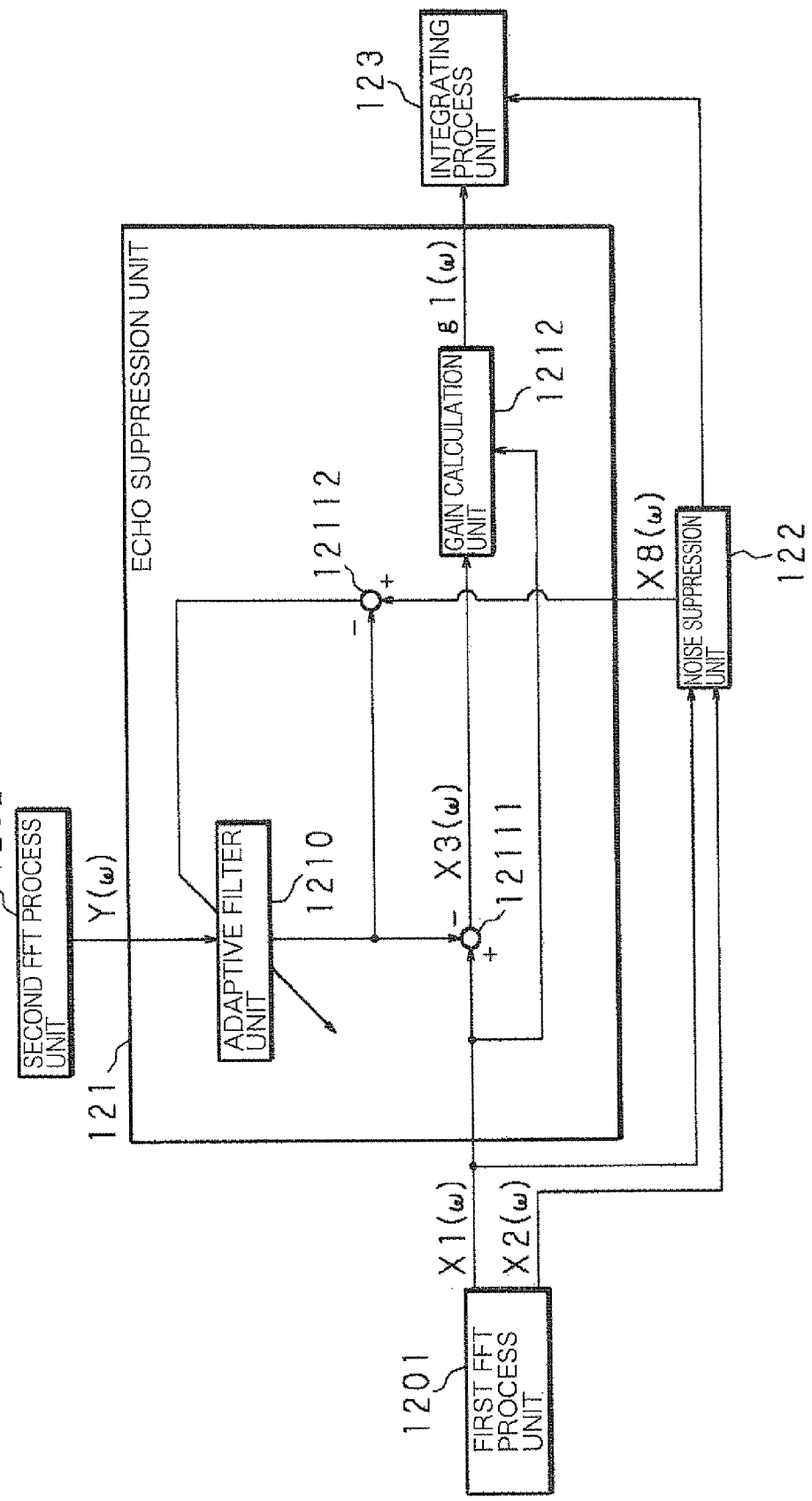
FIG. 24 is a functional block diagram illustrating an exemplary functional structure of an echo suppression unit and the like included in the sound processor of Embodiment 5 of the invention.

The echo suppression unit 121 functioning in the suppressing unit 12 will be described in more detail. FIG. 24 is a functional block diagram illustrating an exemplary functional structure of the echo suppression unit 121 and the like included in the sound processor 1 of Embodiment 5 of the invention. The echo suppression unit 121 includes various program modules such as an adaptive filter unit 1210, a first removal unit 12111, a gain calculation unit 1212 and a second removal unit 12112. It is noted that the first removal unit 12111 executes similar processing to the removal unit 1211 described in Embodiment 1.

The echo suppression unit 121 accepts the first observation sound signal X1(ω) from the first FFT process unit 1201 and accepts the reference sound signal Y(ω) from the second FFT process unit 1202. Also, the echo suppression unit 121 accepts the eighth observation sound signal X8(ω) from the noise suppression unit 122.

The second removal unit 12112 subtracts an echo component from the eighth observation sound signal X8(ω) and passes the resultant to the adaptive filter unit 1210.

Since the eighth observation sound signal X8(ω) obtained by suppressing voice in the first observation sound signal X1(ω) may be regarded to be free from a double-talk state including voice of a speaking person, the adaptive filter unit 1210 of Embodiment 5 may suppress echo with a high degree of accuracy on the basis of a sound signal of single-talk alone. Then, the echo suppression unit 121 calculates echo suppression gain g1(ω), that is, a ratio in absolute values of each frequency component of the third observation sound signal X3(ω) to the first observation sound signal X1(ω), and passes the calculated echo suppression gain g1(ω) to the integrating process unit 123.

Figure 25:
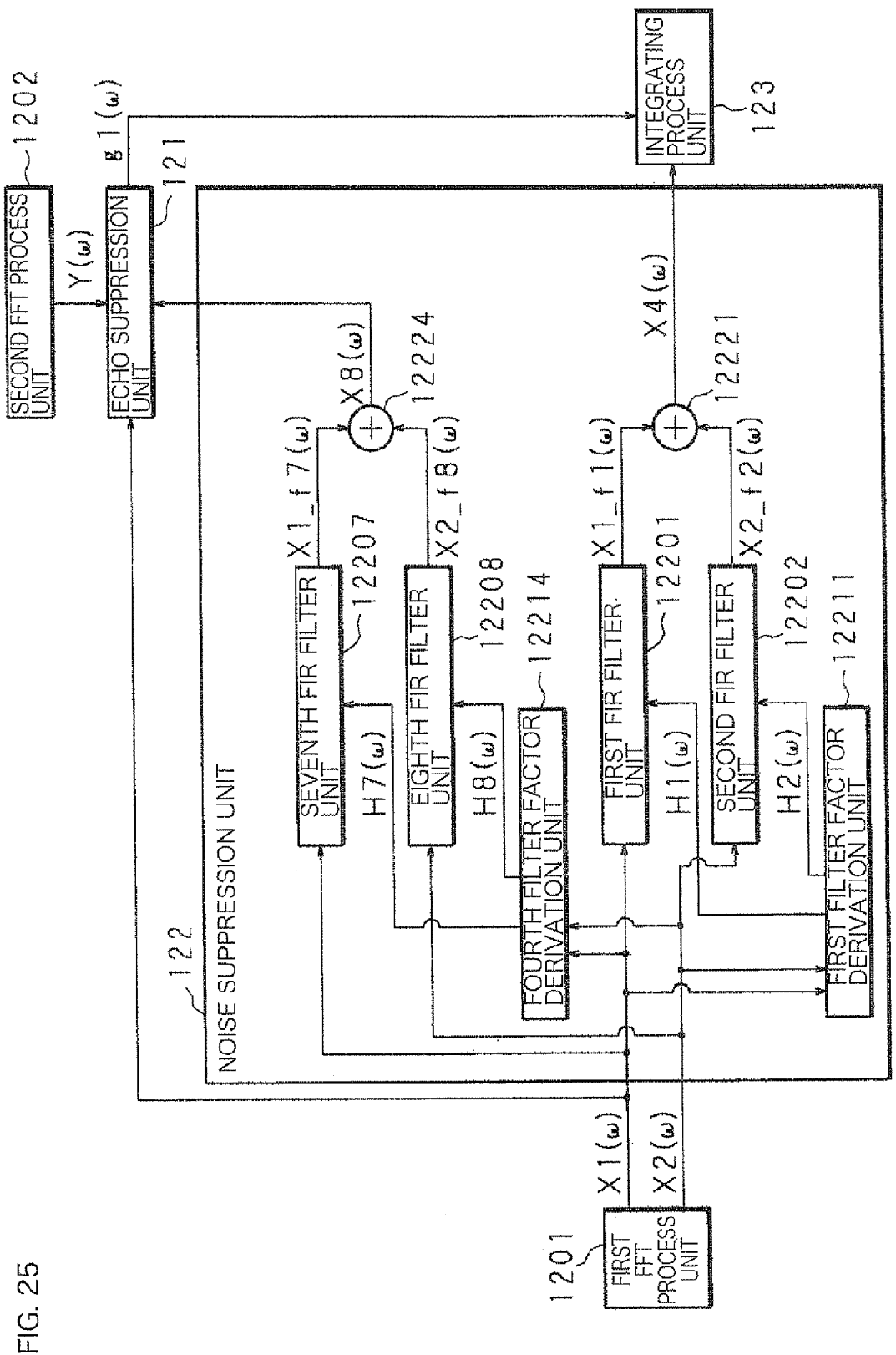
FIG. 25 is a functional block diagram illustrating an exemplary functional structure of a noise suppression unit and the like included in the sound processor of Embodiment 5 of the invention.

The noise suppression unit 122 functioning in the suppressing unit 12 will be described in more detail. FIG. 25 is a block diagram illustrating an exemplary functional structure of the noise suppression unit 122 and the like included in the sound processor 1 of Embodiment 5 of the invention. The noise suppression unit 122 includes various program modules such as a first FIR filter unit 12201 and a second FIR filter unit 12202, a first filter factor derivation unit 12211, a first suppression unit 12221, a seventh FIR filter unit 12207 and an eighth FIR filter unit 12208, a fourth filter factor derivation unit 12214 and a fourth suppression unit 12224.

The noise suppression unit 122 accepts the first observation sound signal $X1(\omega)$ and the second observation sound signal $X2(\omega)$ from the first FFT process unit 1201.

The seventh FIR filter unit 12207 filters the first observation sound signal $X1(\omega)$ on the basis of a seventh filter factor $F7(\omega)$ set therein, and passes a filtered first observation sound signal $X1\_f7(\omega)$ to the fourth suppression unit 12224.

The eighth FIR filter unit 12208 filters the second observation sound signal $X2(\omega)$ on the basis of an eighth filter factor $F8(\omega)$ set therein, and passes a filtered second observation sound signal $X2\_f8(\omega)$ to the fourth suppression unit 12224.

The fourth filter factor derivation unit 12214 derives the seventh filter factor $H7(\omega)$ and the eighth filter factor $H8(\omega)$ respectively on the basis of the first observation sound signal $X1(\omega)$ and the second observation sound signal $X2(\omega)$, passes the derived seventh filter factor $H7(\omega)$ to the seventh FIR filter unit 12207, and passes the eighth filter factor $H8(\omega)$ to the eighth FIR filter unit 12208. The seventh FIR filter unit 12207 and the eighth FIR filter unit 12208 respectively set the seventh filter factor $H7(\omega)$ and the eighth filter factor $H8(\omega)$ thus accepted.

The fourth suppression unit 12224 generates the eighth observation sound signal $X8(\omega)$ with noise arriving from a direction of a speaking person suppressed by summing up the filtered first observation sound signal $X1\_f7(\omega)$ and the filtered second observation sound signal $X2\_f8(\omega)$. In Embodiment 5, the seventh FIR filter unit 12207, the eighth FIR filter unit 12208, the fourth filter factor derivation unit 12214 and the fourth suppression unit 12224 together function as a suppression necessary sound suppression unit for suppressing voice arriving from a direction of a speaking person, namely, suppression necessary sound arriving from a suppression necessary direction.

Then, the noise suppression unit 122 passes the fourth observation sound signal $X4(\omega)$ with ambient noise suppressed to the integrating process unit 123, and passes the eighth observation sound signal $X8(\omega)$ with the voice of the speaking person suppressed to the echo suppression unit 121.

Figure 26:
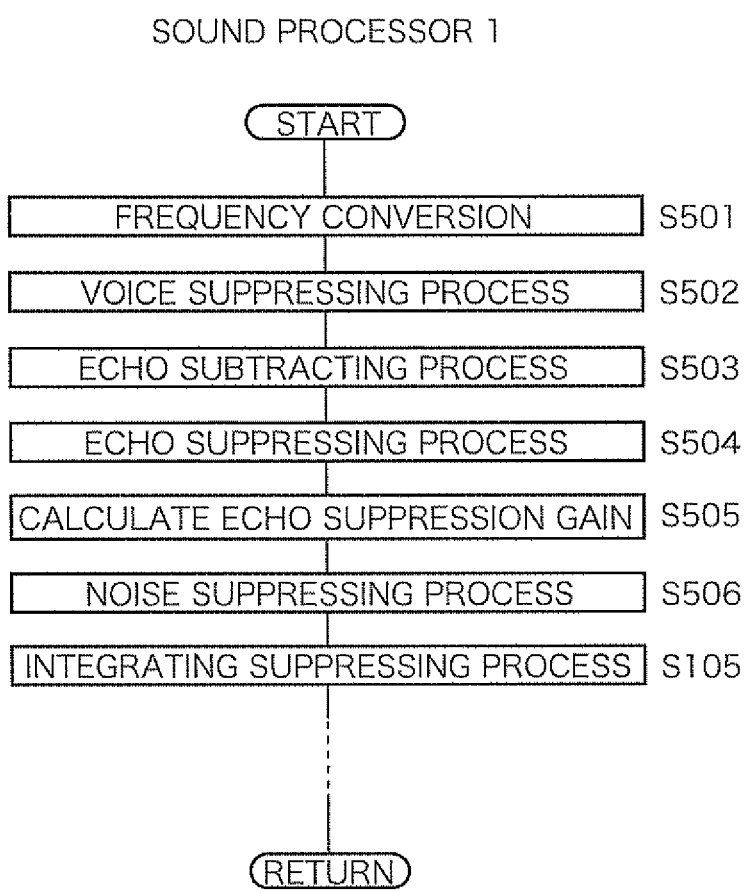
FIG. 26 is a flowchart illustrating an example of processing performed by the sound processor of Embodiment 5 of the invention.

Next, the processing performed by the sound processor 1 of Embodiment 5 of the invention will be described. FIG. 26 is a flowchart illustrating an example of the processing performed by the sound processor 1 of Embodiment 5 of the invention. Through the processing performed by the first FFT process unit 1201 and the second FFT process unit 1202, the suppressing unit 12 of the sound processor 1 frames accepted sound signals and converts the framed sound signals into spectra respectively corresponding to components on the frequency axis (S501).

Through the processing performed by the noise suppression unit 122, the suppressing unit 12 of the sound processor 1 executes a voice suppressing process for suppressing sound arriving from a direction of a speaking person regarded as voice on the basis of a first observation sound signal $X1(\omega)$ and a second observation sound signal $X2(\omega)$ (S502), so as to generate an eighth observation sound signal $X8(\omega)$, and passes the generated eighth observation sound signal $X8(\omega)$ to the echo suppression unit 121.

Through the processing performed by the echo suppression unit 121, the suppressing unit 12 of the sound processor 1 accepts the first observation sound signal $X1(\omega)$, a reference sound signal $Y(\omega)$ and the eighth observation sound signal $X8(\omega)$. Then, through the processing performed by the echo suppression unit 121, the suppressing unit 12 of the sound processor 1 executes an echo subtracting process for removing echo by subtracting an echo component from the eighth observation sound signal $X8(\omega)$ (S503), estimates, on the basis of the result of the echo subtracting process and the reference sound signal $Y(\omega)$, an echo component derived from sound based on the reference sound signal $Y(\omega)$, and executes an echo suppressing process for removing the estimated echo component from the first observation sound signal $X1(\omega)$ (S504), so as to generate a third observation sound signal $X3(\omega)$.

Through the processing performed by the echo suppression unit 121, the suppressing unit 12 of the sound processor 1 calculates echo suppression gain $g1(\omega)$ on the basis of the first observation sound signal $X1(\omega)$ and the third observation sound signal $X3(\omega)$ (S505), and passes the calculated echo suppression gain $g1(\omega)$ to the integrating process unit 123.

Through the processing performed by the noise suppression unit 122, the suppressing unit 12 of the sound processor 1 executes a noise suppressing process on the basis of the first observation sound signal $X1(\omega)$ and the second observation sound signal $X2(\omega)$ (S506), and passes a fourth observation sound signal $X4(\omega)$ with ambient noise suppressed to the integrating process unit 123.

Thereafter, the sound processor 1 executes the processing of S105 and after illustrated in the flowchart of Embodiment 1. Although the respective processings are described to be performed one after another for convenience, the processing of the echo suppression unit 121 and the noise suppression unit 122 is performed substantially in parallel to each other. In this manner, in Embodiment 5, it is possible to estimate echo with a high degree of accuracy on the basis of a sound signal in which voice of a speaking person is suppressed.

Each of Embodiments 1 through 5 described above merely exemplarily describe some of unlimited embodiments of the invention, the structures of various hardware and software may be appropriately set, and various processing may be combined apart from the exemplarily described basic processing. For example, the sound processor of the invention is applicable to any of various systems of sound and acoustic other than the exemplarily described apparatus. Alternatively, the sound processor described in each of Embodiments 1 through 5 may be constructed as a plurality of apparatuses, for example, three apparatuses including a sound outputting apparatus for outputting sound signals, a sound receiving apparatus including the sound receiving unit, and a sound processor for performing the echo suppression and the noise suppression, and three or more sound receiving units may be provided. In this case, with respect to, for example, the echo suppression, the invention may be expanded to various form, for example, depending upon an observation sound signal of which sound receiving unit is to be used for echo estimation. Moreover, Embodiments 1 through 5 described above may be appropriately combined instead of realizing them independently of one another.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification related to a showing of the superiority and inferiority of the invention. Although the embodiments of the present inventions have been described in detail, it should be understood that the various changes, substitutions, and alternations could be made hereto without departing from the spirit and scope of the invention.

What is claimed is:

1. A sound processor comprising:
   a conversion unit converts a reference sound signal corresponding to a base of sound to be output by a sound outputting unit and an observation sound signal based on each of sound signals output by a plurality of sound receiving units into components on a frequency axis;
   an echo suppression unit estimates echo derived from sound based on a converted reference sound signal and suppresses an estimated echo in a converted observation sound signal with respect to each frequency component;
   a noise suppression unit estimates noise based on an arrival direction of sound that is obtained from a time difference between input sounds into the plurality of sound receiving units and suppresses the estimated noise in the converted observation sound signal with respect to each frequency component; and
   an integrating unit suppresses, with respect to each frequency component, echo and noise in the converted sound signal based on an observation sound signal obtained after echo suppression and an observation sound signal obtained after noise suppression,
   wherein the integrating process unit obtains the observation sound signal with the echo and the noise suppressed based on a product of a ratio of each frequency component between the observation sound signals obtained before and after the echo suppression and the observation sound signal obtained after the noise suppression, or the product of the ratio of each frequency component between the observation sound signals obtained before and after the noise suppression and the observation sound signal obtained after the echo suppression.

2. The sound processor according to claim 1, wherein
   the noise suppression unit includes a background noise derivation unit derives background noise based on the converted observation sound signal, and
   the noise suppression unit suppresses noise in consideration of a product of a ratio of each frequency component of the observation sound signals obtained before and after the echo suppression and the background noise derived by the background noise derivation unit.

3. The sound processor according to claim 2, wherein
   the background noise derivation unit derives the background noise by smoothing, with respect to each frequency component, time change of the converted observation sound signal.

4. The sound processor according to claim 1, wherein
   the noise suppression unit includes an output sound suppression unit for suppressing, in the converted observation sound signal, a frequency component of sound estimated to have arrived from a direction of the sound outputting unit,
   the echo suppression unit includes a background noise derivation unit derives background noise on the basis of a frequency component of the converted observation sound signal at which a ratio between observation sound signals obtained before and after suppression by the output sound suppression unit is not more than a prescribed value, and
   the echo suppression unit suppresses echo estimated in consideration of the background noise derived by the background noise derivation unit.

5. The sound processor according to claim 4, wherein
   the noise suppression unit includes a background noise derivation unit derives background noise on the basis of a frequency component of the converted observation sound signal at which a ratio between the observation sound signals obtained before and after the echo suppression exceeds a prescribed value, and
   the noise suppression unit suppresses noise in consideration of the background noise derived by the background noise derivation unit.

6. The sound processor according to claim 4, wherein
   the background noise derivation unit derives the background noise by smoothing, with respect to each frequency component, time change of the converted observation sound signal.

7. The sound processor according to claim 1, wherein
   the noise suppression unit includes a target sound enhancement unit enhances a target sound arriving from a prescribed target direction by performing, on the converted observation sound signal, an enhancing process for enhancing a frequency component of a sound signal estimated to have arrived from the target direction and/or a suppressing process for suppressing a frequency component of a sound signal estimated to have arrived from a direction other than the target direction, and
   the echo suppression unit includes:
   a filter unit derives an echo component to be suppressed in the converted observation sound signal by filtering the converted reference sound signal by using a filter factor calculated and updated with respect to each frequency component; and
   an update necessity discrimination unit determines, on the basis of an observation sound signal in which the target sound is enhanced by the target sound enhancement unit, whether or not the filter factor of the filter unit needs to be updated.

8. The sound processor according to claim 1, wherein
   the noise suppression unit includes a suppression necessary sound suppression unit suppresses sound arriving from a prescribed suppression necessary direction by suppressing, in the converted observation sound signal, a frequency component of a sound signal estimated to have arrived from the suppression necessary direction,
   the echo suppression unit includes a filter unit derives an echo component to be suppressed by filtering the converted reference sound signal by using a filter factor calculated and updated with respect to each frequency component, and
   the filter unit calculates and updates the filter factor on the basis of the converted reference sound signal and an observation sound signal in which suppression necessary sound has been suppressed.

9. A sound processing method comprising:
   converting a reference sound signal corresponding to a base of sound to be output by a sound outputting unit and an observation sound signal based on each of the sound signals output by a plurality of sound receiving units into components on a frequency axis;
   estimating echo derived from sound based on a converted reference sound signal and suppressing an estimated echo in a converted observation sound signal with respect to each frequency component;
   estimating noise based on an arrival direction of sound that is obtained from a time difference between sounds input to the plurality of sound receiving units and suppressing the estimated noise in the converted observation sound signal with respect to each frequency component; and
   suppressing, with respect to each frequency component, echo and noise in the converted observation sound signal based on an observation sound signal obtained after echo suppression and an observation sound signal obtained after noise suppression, wherein suppressing obtains the observation sound signal with the echo and the noise suppressed based on a product of a ratio of each frequency component between the observation sound signals obtained before and after the echo suppression and the observation sound signal obtained after the noise suppression, or the product of the ratio of each frequency component between the observation sound signals obtained before and after the noise suppression and the observation sound signal obtained after the echo suppression.

10. A non-transitory computer readable recording medium storing a sound processing program comprising:

causing the computer to convert a reference sound signal corresponding to a base of sound to be output by a sound outputting unit and an observation sound signal based on each of the sound signals output by a plurality of sound receiving units into components on a frequency axis;

causing the computer to estimate echo derived from sound based on a converted reference sound signal and suppressing an estimated echo in a converted observation sound signal with respect to each frequency component;

causing the computer to estimate noise based on an arrival direction of sound that is obtained from a time difference between sounds input to the plurality of sound receiving units and suppressing the estimated noise in the converted observation sound signal with respect to each frequency component; and causing the computer to suppress echo and noise in the converted observation sound signal based on an observation sound signal obtained after echo suppression and an observation sound signal obtained after noise suppression with respect to each frequency component, wherein the causing the computer to suppress echo and noise obtains the observation sound signal with the echo and the noise suppressed based on a product of a ratio of each frequency component between the observation sound signals obtained before and after the echo suppression and the observation sound signal obtained after the noise suppression, or the product of the ratio of each frequency component between the observation sound signals obtained before and after the noise suppression and the observation sound signal obtained after the echo suppression.

* * * * *